US010425951B2

(12) United States Patent
Mildh et al.

(10) Patent No.: US 10,425,951 B2
(45) Date of Patent: Sep. 24, 2019

(54) FIRST NETWORK NODE, THIRD NETWORK NODE, WIRELESS DEVICE, AND METHODS PERFORMED THEREBY FOR FACILITATING CELL SELECTION

(71) Applicant: Telefonaktiebolaget LM Ericsson (publ), Stockholm (SE)

(72) Inventors: Gunnar Mildh, Sollentuna (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/763,528

(22) PCT Filed: Dec. 28, 2017

(86) PCT No.: PCT/SE2017/051355
§ 371 (c)(1),
(2) Date: Mar. 27, 2018

(87) PCT Pub. No.: WO2018/174767
PCT Pub. Date: Sep. 27, 2018

(65) Prior Publication Data
US 2019/0053244 A1    Feb. 14, 2019

Related U.S. Application Data

(60) Provisional application No. 62/475,383, filed on Mar. 23, 2017.

(51) Int. Cl.
*H04W 72/08*  (2009.01)
*H04W 48/08*  (2009.01)
(Continued)

(52) U.S. Cl.
CPC ......... *H04W 72/082* (2013.01); *H04W 48/08* (2013.01); *H04W 48/10* (2013.01);
(Continued)

(58) Field of Classification Search
CPC . H04W 72/082; H04W 72/048; H04W 48/10; H04W 72/046; H04W 48/08; H04W 48/16; H04W 48/20
See application file for complete search history.

(56) References Cited

U.S. PATENT DOCUMENTS

| | | | | |
|---|---|---|---|---|
| 2011/0211487 A1* | 9/2011 | Han | ...................... | H04B 7/024 370/252 |
| 2015/0373601 A1* | 12/2015 | Benjebbour | ........ | H04W 72/082 370/252 |
| 2017/0054534 A1* | 2/2017 | Sang | ...................... | H04L 5/005 |

FOREIGN PATENT DOCUMENTS

| | | |
|---|---|---|
| WO | 2016089146 A1 | 6/2016 |
| WO | 2016155776 A1 | 10/2016 |

OTHER PUBLICATIONS

Author Unknown, "Technical Specification Group Services and System Aspects; Study on Architecture for Next Generation System (Release 14)," Technical Report 23.799, Version 1.1.0, 3GPP Organizational Partners, Oct. 2016, 501 pages.

(Continued)

*Primary Examiner* — Brandon J Miller
(74) *Attorney, Agent, or Firm* — Withrow & Terranova, PLLC

(57) ABSTRACT

Method performed by a first network node, connected to a second network node serving a wireless device in a first cell. The first cell has a second cell as neighbor. Each cell has a first beamforming configuration for a first use corresponding to a first beam gain, and a second configuration for a second use corresponding to a second gain. The first network node obtains, for each cell, a first indication of the second gain in relation to the first. The first network node also determines, based on the first indication, a first value to be applied in a cell selection procedure between the first and the second cell. The first network node initiates sending the second (Continued)

indication of the first value, or a third indication of the first indication.

25 Claims, 8 Drawing Sheets

(51) Int. Cl.
    *H04W 48/16*     (2009.01)
    *H04W 48/20*     (2009.01)
    *H04W 48/10*     (2009.01)
    *H04W 72/04*     (2009.01)

(52) U.S. Cl.
    CPC ........... *H04W 48/16* (2013.01); *H04W 48/20* (2013.01); *H04W 72/046* (2013.01); *H04W 72/048* (2013.01)

(56) References Cited

OTHER PUBLICATIONS

Ericsson, "3GPP Draft R2-1700862: Ping pong handovers upon state transitions," Third Generation Partnership Project (3GPP) TSG-RAN WG2 Meeting #97, Feb. 13-17, 2017, 6 pages, Athens, Greece.
Ericsson, "3GPP Draft R2-168727: Inter-node ping-pong avoidance in state transitions," Third Generation Partnership Project (3GPP) WG2 Meeting #96, Nov. 14-18, 2016, 4 pages, Reno, Nevada, USA.
International Search Report and Written Opinion for International Patent Application No. PCT/SE2017/051355, dated Mar. 12, 2018, 18 pages.

\* cited by examiner

FIRST NETWORK NODE, THIRD NETWORK NODE, WIRELESS DEVICE, AND METHODS PERFORMED THEREBY FOR FACILITATING CELL SELECTION

This application is a 35 U.S.C. § 371 national phase filing of International Application No. PCT/SE2017/051355, filed Dec. 28, 2017, which claims the benefit of U.S. Provisional Application No. 62/475,383, filed Mar. 23, 2017, the disclosures of which are incorporated herein by reference in their entireties.

TECHNICAL FIELD

The present disclosure relates generally to a first network node and methods performed thereby for facilitating cell selection. The present disclosure also relates generally to a third network node, and methods performed thereby for facilitating cell selection. The present disclosure further relates generally to a wireless device, and methods performed thereby for facilitating cell selection.

BACKGROUND

Communication devices within a wireless communications network may be e.g., stations (STAs), User Equipments (UEs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the Radio Access Network (RAN), with another entity, such as another terminal or a server.

Communication devices may also be network nodes, or Transmission Points (TP). The wireless communications network covers a geographical area which may be divided into cell areas, each cell area being served by an access node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g., Wide Area Base Stations, Medium Range Base Stations, Local Area Base Stations and Home Base Stations, based on transmission power and thereby also cell size. A cell may be understood as the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station. 3GPP LTE radio access standard has been written in order to support high bitrates and low latency both for uplink and downlink traffic. All data transmission is in LTE controlled by the radio base station.

The standardization organization 3GPP is currently in the process of specifying a New Radio Interface called NR or 5G-UTRA, as well as a Fifth Generation (5G) Packet Core Network, which may be referred to as Next Generation Core Network, abbreviated as NG-CN, New Generation Core (NGC) or 5G CN. The current understanding of various concepts related to this work may be based on input from 3GPP TS 23.799 v1.1.0, and it is summarized below.

Initial High Level Architectural View

FIG. 1 is a schematic representation of the current high level architecture of a system according to the Next Generation, also referred to as a Next Gen System. This high level architecture may be used as a reference model herein. FIG. 1 shows the NextGen UE, NextGen®AN, NextGen Core and their reference points.

If, and possibly how, the NextGen UE may interface with the NextGen Core is currently set for further study.

Reference points in the Next Gen System may be as follows:

NG2: Reference point for the control plane between NextGen®AN and NextGen Core.

NG3: Reference point for the user plane between NextGen®AN and NextGen Core.

NG1: Reference point for the control plane between NextGen UE and NextGen Core.

NG6: It is the reference point between the NextGen Core and the data network. The data network may be an operator external public or private data network or an intra-operator data network, e.g., for provision of IP Multimedia Services (IMS) services. This reference point corresponds to SGi for 3GPP accesses.

The 5G RAN may comprise base stations supporting evolved LTE and/or New Radio (NR) radio access. The term for a 5G/NR eNB is gNB, i.e., the new 5G/NR base station is referred to as a gNB.

The 5G System is expected to support deployments in virtualized environments and introduce support for scaling of a network function instance; and dynamic addition or removal of a network function instance.

The 5G system currently being standardized by 3GPP is expected to often be deployed in conditions where achieving appropriate coverage, e.g., cell edge coverage, may be challenging. This may be especially the case when high carrier frequencies, e.g., >6 Giga Hertz (GHz) may be utilized.

To combat the low Signal-to-Noise Ratio (SNR)/Signal to Interference plus Noise Ratio (SINR), a UE may experience at the coverage edge, as well as to achieve high data rates, beamforming, where the radiated energy may be focused in a more or less narrow beam, is expected to be commonly used. In deployments with high carrier frequencies, both dedicated data transmission and common control channel transmissions may be subject to beamforming. In the latter case in particular, the purpose is to achieve acceptable SNR/SINR at the edge of the coverage area. In deployments with lower or semi-high carrier frequencies, common control channels may be transmitted using omnidirectional transmission or wide beam, e.g., sector coverage, transmission, possibly with some repetition, while narrow high-gain beamforming may still be used for dedicated communication, where a single specific UE is targeted, in order to achieve high data rates, especially for user plane communication.

In addition to the Radio Resource Control (RRC)_IDLE and RRC_CONNECTED states of LTE, a new state is introduced in NR, tentatively denoted RRC_INACTIVE, which may be understood to be similar to the new Suspended mode, which is currently being specified for LTE. In this state, the UE context, that is, the information associated with the UE, such as security parameters and bearer configuration information, in the RAN, that is, in a gNB, and the S1 connection, that is, the UE associated connection between the RAN and the core network, assumedly between a gNB in the RAN and a Mobility Management Entity (MME) in the NGC, may be maintained, but no radio bearers are kept active. The UE context and S1 connection may be maintained by a gNB that may be referred to as "anchor gNB", typically the gNB with which the UE was last in RRC_CONNECTED state. A UE in RRC_INACTIVE state may move around in a limited area, e.g., called "RAN based notification area" without notifying the network. If the network needs to reach the UE for DL data transmission, it may page—or notify—the UE in the RAN based notification area allocated to the UE, possibly in a stepwise approach, where the UE may be first paged/notified in a smaller area, which may be stepwise increased in case the UE does not respond to the page/notification. If the UE leaves its RAN based notification area, it may notify the network, which may allocate a new RAN based notification area to the UE, and may also move the UE context and S1 connection, visible to the core network as a path switch to the gNB, where the UE notified its presence.

For a UE in RRC_IDLE state, the RAN may maintain no context and no S1 connection, but the core network may maintain state information and keep track of the whereabouts of a UE on a coarse level, defined by a list of Tracking Areas configured for the UE. A UE in RRC_IDLE state may move around without notifying the network within the cells covered by the list of Tracking Areas allocated to the UE by the core network, e.g. by a MME. If the UE enters a cell which is not covered by the list of Tracking Areas of the UE, it may notify the network through a Tracking Area Update procedure.

A UE in RRC_IDLE or RRC_INACTIVE state may monitor the appropriate control channel for paging in the cell the UE may be currently located in. To determine the appropriate cell for monitoring for paging, the UE may perform measurements on the appropriate DL signals in available cells, and may select the most suitable cell in accordance with the measurement results, typically, the cell where the UE experiences the best DL radio channel quality, e.g. in terms of SNR or SINR. The DL signals to measure on for this purpose may be reference signals, such as Cell Specific Reference signals (CSR) in LTE or, in NR, synchronization signals, serving as reference signals too, i.e., Primary Synchronization Signals (PSS), Secondary Synchronization Signals (SSS), a.k.a., NR-PSS, NR-SSS, and possibly Tertiary Synchronization Signals (TSS), or possibly Synchronization Signals (SS) Block transmissions and/or possibly separate reference signals. The SS Block in NR may consist of synchronization signal components, PSS, SSS and possibly TSS1, combined with a broadcast channel denoted NR Physical Broadcast Channel (NR-PBCH). A UE that keeps track of the synchronization and monitors for paging in a selected cell is said to be camping on that cell. The UE may also have to acquire, at least relevant parts of, the system information in the cell it may be camping on.

A UE in RRC_IDLE or RRC_INACTIVE state camping on a cell may spend most of its time in an energy saving low-power mode, often referred to as Discontinuous Reception (DRX) sleep mode. It may wake up only to reacquire synchronization, monitor the DL for pages, at configured paging occasions, and to perform channel quality measurements in the current cell and possibly neighbor cells, for the purpose of cell reselection assessment, that is, to assess whether it should start camping on another cell. Typically, the UE may reacquire synchronization, if needed, and perform channel quality measurements in conjunction with the page monitoring. In addition, the UE may occasionally acquire the relevant system information in the current and/or neighboring cells.

As mentioned above, the UE may perform cell reselection assessments and decisions based on radio channel quality measurements in the current and neighbor cells. In addition, the UE may have to take into account channel quality thresholds and cell specific offsets, which the network may optionally configure and convey to the UE in the form of system information in the current/serving cell, and which may govern which differences in radio channel quality between the current and a certain neighbor cell may trigger cell reselection to the concerned neighbor cell. If the radio channel quality measurements motivate a cell reselection, then the UE may have to acquire relevant parts of the system information in the candidate cell, that is, the neighbor cell that may be being considered for cell reselection, to check that there are no obstacles for the UE to camp on it, e.g., that the cell is not barred, or is a Closed Subscriber Group (CSG) cell that is closed for the UE, or belongs to an area where the UE is not allowed service, or to a Public Land Mobile Network (PLMN) the UE is not allowed to access, before actually executing the cell reselection.

Existing methods for cell reselection assessments and decisions based on radio channel quality measurements in current and neighbor cells in deployments such as 5G/NR deployments may result in suboptimal choice of cell for reselection, creation of unnecessary overhead, and may result in ping-pong behavior by the UE.

SUMMARY

It is an object of embodiments herein to improve the handling of a cell selection procedure. It is a particular object of embodiments herein to improve the handling of the cell selection procedure in a 5G/NR deployment.

According to a first aspect of embodiments herein, the object is achieved by a method performed by a first network node. The first network node is connected to a second network node serving a wireless device with beamforming in a first cell. The first cell has a second cell as a neighbor cell. Each of the first cell and the second cell have a first beamforming configuration for a first use corresponding to a first beam gain, and a second beamforming configuration for a second use corresponding to a second beam gain. The first network node, the second network node and the wireless device operate in a wireless communications network. The first network node obtains, for each of the first cell and the second cell, a first indication of the second beam gain in relation to the first beam gain. The first indication is cell-specific. The first network node also determines, based on the first indication obtained for each of the first cell and the second cell, a first value to be applied in a first cell selection procedure between the first cell and the second cell. The first network node further initiates sending at least one of: i) a second indication of the determined first value, and ii) a third indication of the obtained first indication, to at least one of: the wireless device, the second network node, and a third network node operating in the wireless communications network.

According to a second aspect of embodiments herein, the object is achieved by a method performed by the third network node. The third network node serves the second cell with beamforming. The second cell has the first beamforming configuration for the first use corresponding to the first beam gain, and the second beamforming configuration for the second use corresponding to the second beam gain. The third network node operates in the wireless communications network. The third network node obtains, for the second cell, a sixth indication of the second beam gain in relation to the first beam gain. The sixth indication is cell-specific. The third network node also initiates sending the first indication of the obtained sixth indication to at least one of: the second network node operating in the wireless communications network, wherein the second cell is the neighbor to the first cell served by the second network node, the wireless device served by the second network node, and the first network node operating in the wireless communications network.

According to a third aspect of embodiments herein, the object is achieved by a method performed by the wireless device. The wireless device is served by the second network node with beamforming in the first cell. The first cell has the second cell as the neighbor cell. Each of the first cell and the second cell have the first beamforming configuration for the first use corresponding to the first beam gain, and the second beamforming configuration for the second use corresponding to the second beam gain. The wireless device and the second network node operate in the wireless communications network. The wireless device obtains the second indication of the first value to be applied in the first cell selection procedure between the first cell and the second cell. The first value is based on the first indication, for each of the first cell and the second cell, of the second beam gain in relation to the first beam gain. The first indication is cell-specific. The wireless device applies the first value to the first cell selection procedure between the first cell and the second cell.

According to a fourth aspect of embodiments herein, the object is achieved by the first network node, configured to be connected to the second network node configured to serve the wireless device with beamforming in the first cell. The first cell is configured to have the second cell as the neighbor cell. Each of the first cell and the second cell are configured to have a first beamforming configuration for a first use corresponding to a first beam gain, and the second beamforming configuration for the second use corresponding to the second beam gain. The first network node, the second network node and the wireless device are configured to operate in the wireless communications network. The first network node is further configured to obtain, for each of the first cell and the second cell, the first indication of the second beam gain in relation to the first beam gain. The first indication is configured to be cell-specific. The first network node is configured to determine, based on the first indication configured to be obtained for each of the first cell and the second cell, a first value to be applied in the first cell selection procedure between the first cell and the second cell. The first network node is further configured to initiate sending at least one of: i) the second indication of the first value configured to be determined, and ii) the third indication of the first indication configured to be obtained, to at least one of: the wireless device, the second network node, and the third network node, configured to operate in the wireless communications network.

According to a fifth aspect of embodiments herein, the object is achieved by the third network node, configured to serve the second cell with beamforming. The second cell is configured to have the first beamforming configuration for the first use corresponding to the first beam gain, and the second beamforming configuration for the second use corresponding to the second beam gain. The third network node is configured to operate in the wireless communications network. The third network node is further configured to obtain, for the second cell, the sixth indication of the second beam gain in relation to the first beam gain. The sixth indication is configured to be cell-specific. The third network node is further configured to initiate sending the first indication of the sixth indication configured to be obtained to at least one of: the second network node configured to operate in the wireless communications network, wherein the second cell is the neighbor to the first cell served by the second network node, the wireless device configured to be served by the second network node, and the first network node configured to operate in the wireless communications network.

According to a sixth aspect of embodiments herein, the object is achieved by the wireless device, configured to be served by the second network node with beamforming in the first cell. The first cell is configured to have the second cell as the neighbor cell. Each of the first cell and the second cell are configured to have the first beamforming configuration for the first use corresponding to the first beam gain, and the second beamforming configuration for the second use corresponding to the second beam gain. The wireless device and the second network node are configured to operate in the wireless communications network. The wireless device is further configured to obtain the second indication of a first value to be applied in the first cell selection procedure between the first cell and the second cell. The first value is configured to be based on the first indication, for each of the first cell and the second cell, of the second beam gain in relation to the first beam gain. The first indication is configured to be cell-specific. The wireless device is further configured to apply the first value to the first cell selection procedure between the first cell and the second cell.

By the first network node obtaining the first indication of the second beam gain in relation to the first beam gain for each of the first cell and the second cell, and determining the first value to be applied in the cell selection procedure between the first cell and the second cell, and then, initiating sending the second indication of the first value to the wireless device, the second network node and the third network node, any or all of the wireless devices, the second network node and the third network node may be enabled, when performing cell reselection, to rank the quality of the first cell and the second cell in a more comparable way, taking into consideration differences in beamforming configurations a cell may have for different uses. Suboptimal target cell selections and/or handover decisions may thereby be avoided. Furthermore, ping-pong behavior, e.g., in conjunction with transition between different states may be avoided or reduced.

These advantages may also be facilitated by the second network node and the first network node exchanging the first indication of the of the second beam gain in relation to the first beam gain for each of the first cell and the second cell.

Further advantages of particular embodiments are described below.

BRIEF DESCRIPTION OF THE DRAWINGS

Examples of embodiments herein are described in more detail with reference to the accompanying drawings, and according to the following description.

DETAILED DESCRIPTION

Figure 1:
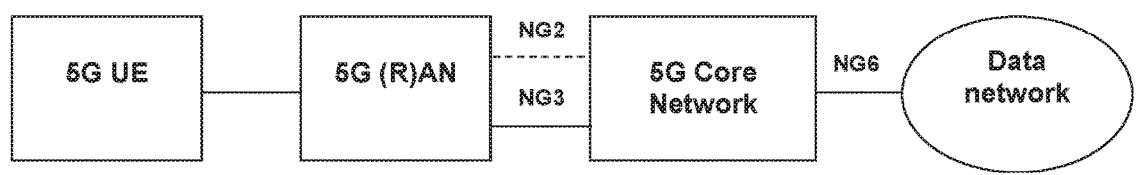
FIG. 1 is a schematic diagram illustrating an initial high level architecture view for a NextGen System, according to existing methods.

As part of the development of embodiments herein, a problem will first be identified and discussed.

The problem with the existing technology which is addressed by embodiments described herein has its root in the dependence of beamforming on common control signals and/or dedicated data transmissions in future 5G/NR deployments in high or semi-high carrier frequency bands. It may also be related to the possible different views on the main purpose of camping.

The main problem is caused by the fact that one beamforming configuration may be used for transmission of the DL signal, e.g., NR-PSS+NR-SSS or SS Block or some other reference signal, the UE may be measuring on when performing its cell reselection assessments, one beamforming configuration may be used when the UE may be paged, and one beamforming configuration may be used when the UE is communicating in RRC_CONNECTED state, and these three beamforming configurations may all be different from each other. Furthermore, the beamforming configurations, as well as their mutual differences, may differ between cells, depending on e.g., the cell type and the capabilities of the gNB or Transmission/Reception Point or Transmit/Receive Point (TRP) serving the cell.

This means that when the UE selects a cell based on the measured quality of the DL signal provided for measurement, e.g., NR-PSS+NR-SSS or SS Block or some other reference signal, this may be a suboptimal choice of cell for monitoring paging in. This is a problem, especially if being reachable for paging is considered the main purpose of camping. Likewise, it may be a suboptimal choice if the purpose of camping is to be prepared to access the cell for RRC_CONNECTED state communication, such as user plane communication. In the latter case, an additional problematic consequence of such a suboptimal choice is that after transitioning to RRC_CONNECTED state, the UE may potentially more or less immediately be handed over to another cell, where higher data rates may be achieved due to higher gain beamforming for RRC_CONNECTED state communication, thereby creating additional overhead. This may happen if cell quality assessment is differently performed in RRC_CONNECTED state, which is not unlikely to be the case. And when the UE switches back to RRC_IDLE or RRC_INACTIVE state, it may reselect back to the previous cell again, resulting in a ping-pong behavior in conjunction with state transitions.

In order to address this problem, several embodiments are comprised herein. As a summarized overview, embodiments herein may be understood to relate to configuring cell specific offsets in the cell reselection information, which may be provided to the UE in the system information and potentially in dedicated signalling, to compensate cell reselection measurements and/or the cell reselection assessments based on these measurements for differences in beamforming gain ratios, that is, differences in beamforming gain differences, between different cells. Furthermore, to enable utilization of cell specific offsets for this purpose, RAN nodes, e.g., gNBs, may exchange information about beamforming gain ratios, that is, differences in beamforming gain between transmissions of DL signal(s) used for cell reselection measurements, e.g., NR-PSS+NR-SSS or SS Block or some other reference signal, paging and RRC_CONNECTED state communication. Particular embodiments herein may therefore relate to exchange of beam gain ratios among network nodes, to facilitate cell specific offset setting. A number of further embodiments and variations are also described in section "Further embodiments and variations".

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from 5G has been used in this disclosure to exemplify the embodiments herein, this should not be seen as limiting the scope of the embodiments herein to only the aforementioned system. Other wireless systems, including 3GPP LTE may also benefit from exploiting the ideas covered within this disclosure.

Figure 2:
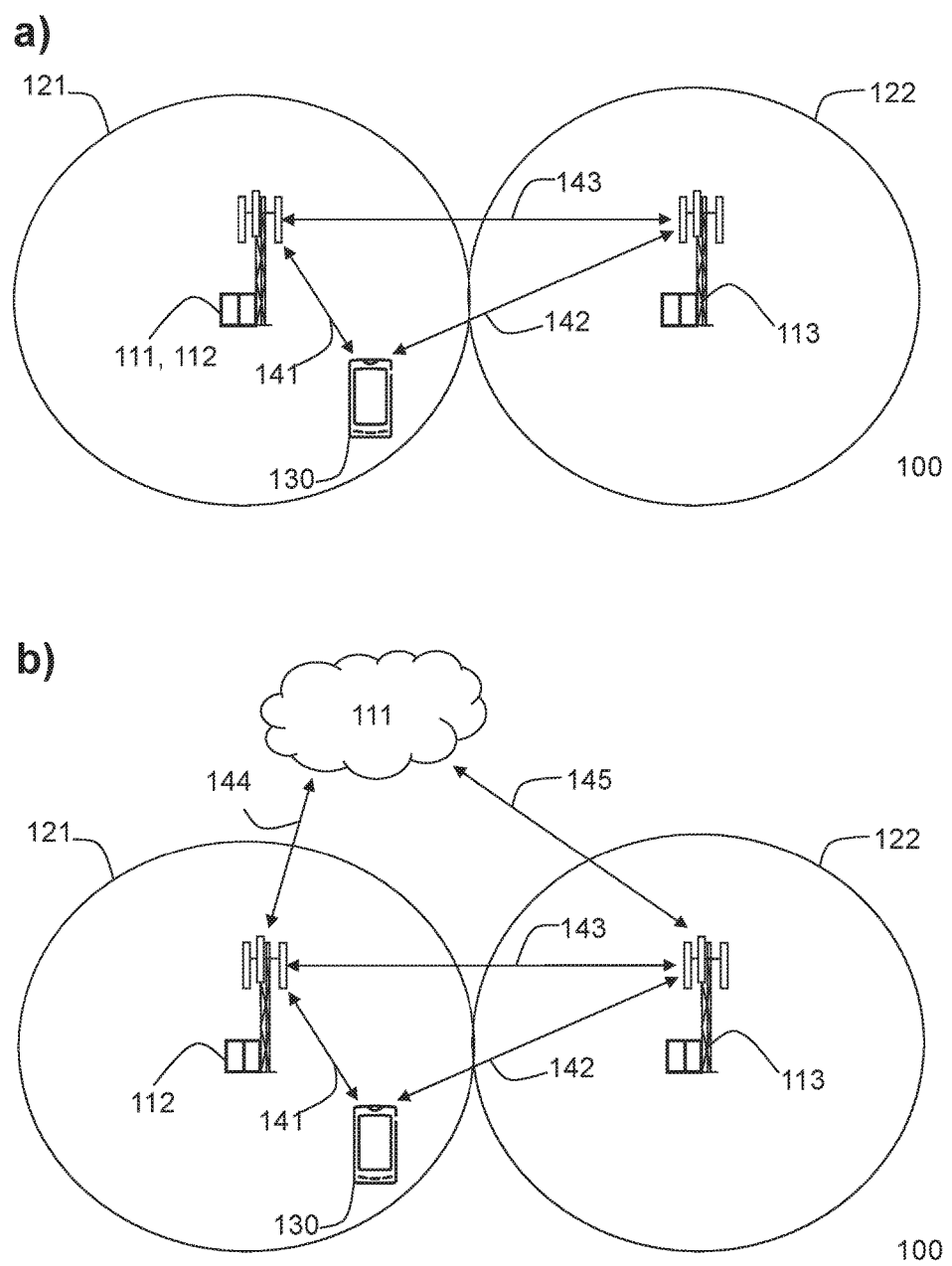
FIG. 2 is a schematic diagram illustrating a wireless communications network, according to embodiments herein.

FIG. 2 depicts two non-limiting examples, in FIGS. 2a, and 2b respectively, of a wireless communications network 100, sometimes also referred to as a wireless communications system, cellular radio system, or cellular network, in which embodiments herein may be implemented. The wireless communications network 100 may typically be a 5G system, 5G network, or Next Gen System or network. The wireless communications network 100 may support other technologies such as, for example, Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, Enhanced Data rates for GSM Evolution (EDGE) network, GSM/EDGE Radio Access Network (GERAN) network, Ultra-Mobile Broadband (UMB), network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR may be used in this disclosure to exemplify embodiments herein, this should not be seen as limiting the scope of the embodiments herein to only the aforementioned system. The wireless communications network may also be understood as a non-cellular system, comprising network nodes which may serve receiving nodes, such as wireless devices, with serving beams. This may be a typical case, e.g., a in a 5G network.

The wireless communications network 100 comprises a plurality of network nodes, whereof a first network node 111, a second network node 112 and a third network node 113 are depicted in the non-limiting examples of FIG. 2. Each of the second network node 112, and the third network node 113 may be radio network nodes. In a typical scenario, depicted in FIG. 2a, the first network node 111 and the second network node 112 may be co-located, or be the same node. In other examples, such as that depicted in FIG. 2b, the first network node 111 may be a network node, e.g., a distributed node, such as a virtual node in the cloud.

The wireless communications network 100 comprises a plurality of radio network nodes, whereof the second network node 112 and the third network node are depicted in FIG. 2. Each of the second network node 112 and the third network node 113 may be a gNB. That is, a transmission point such as a radio base station, for example an eNB, an eNodeB, or a Home Node B, an Home eNode B or any other network node capable of serving a wireless device, such as a user equipment or a machine type communication device, in the wireless communications network 100.

The wireless communications network 100 covers a geographical area which may be divided into cell areas, wherein each cell area may be served by a radio network node, although, one radio network node may serve one or several cells. The wireless communications network 100 comprises at least a first cell 121 and a second cell 122, the second cell 122 being a neighbor cell of the first cell 121. In the non-limiting example depicted in FIG. 2, the second network node 112 serves the first cell 121, and the third network node 113 serves the second cell 122. In other examples, which are not depicted in FIG. 2, the second network node 112 may serve both of the first cell 121 and the second cell 122. Even in examples wherein the wireless communications network 100 may not be referred to as a cellular system, if each of the second network node 112 and the third network node 113 may serve receiving nodes, such as wireless devices, with serving beams, the areas of coverage of the beams may still be referred to as cells. Each of the second network node 112 and the third network node 113 may be of different classes, such as, e.g., macro eNodeB, home eNodeB or pico base station, based on transmission power and thereby also cell size. Each of the second network node 112 and the third network node 113 may support one or several communication technologies, and its name may depend on the technology and terminology used. In 5G/NR, each of the second network node 112 and the third network node 113, which may be referred to as gNBs, may be directly connected to one or more core networks, which are not depicted in FIG. 2.

A plurality of wireless devices is located in the wireless communication network 100, whereof a wireless device 130, is depicted in the non-limiting example of FIG. 2. The wireless device 130 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the wireless devices comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may comprised within the wireless communications network 100.

The second network node 112 may be a serving radio network node of the wireless device 130. The wireless device 130 may be configured to communicate within the wireless communications network 100 with the second network node 112 over a first link 141, e.g., a radio link. The wireless device 130 may be configured to communicate within the wireless communications network 100 with the third network node 113 over a second link 142, e.g., a radio link. The second network node 112 may be configured to communicate within the wireless communications network 100 with the third network node 113 over a third link 143, e.g., a radio link. The first network node 111 may be configured to communicate within the wireless communications network 100 with the second network node 112 over a fourth link 144, e.g., a radio link or a wired link. The first network node 111 may be configured to communicate within the wireless communications network 100 with the third network node 113 over a fifth link 145, e.g., a radio link.

In general, the usage of "first", "second", and/or "third", "fourth" and "fifth" herein may be understood to be an arbitrary way to denote different elements or entities, and may be understood to not confer a cumulative or chronological character to the nouns they modify.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are: a) embodiments related to a first network node, such as the first network node 111; b) embodiments related to a third network node, such as the third network node 113; and c) embodiments related to a wireless device, such as the wireless device 130, e.g., a UE.

Embodiments herein may be described with some non-limiting examples. In the following description any reference to the serving gNB may be understood to relate to the first network node 111; any reference to the neighbor gNB may be understood to relate to the second network node 112; and any reference to a/the UE may be understood to relate to the wireless device 130.

Figure 3:
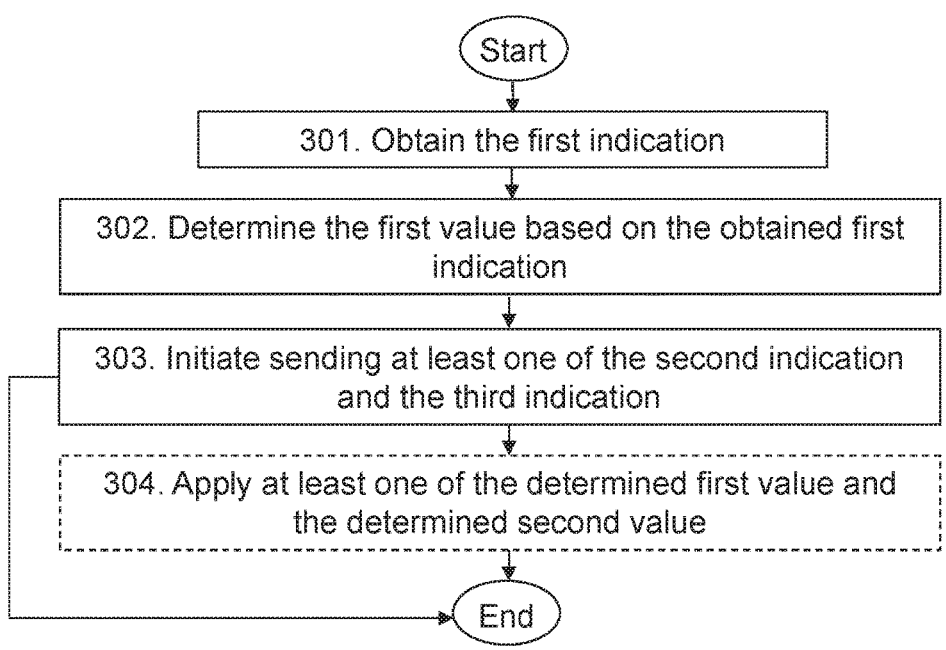
FIG. 3 is a flowchart depicting a method in a first network node, according to embodiments herein.

Embodiments of method performed by the first network node 111, will now be described with reference to the flowchart depicted in FIG. 3. The method may be understood to be for facilitating cell selection. The first network node 111 is connected to the second network node 112 serving the wireless device 130 with beamforming in the first cell 121. The first cell 121 has the second cell 122 as a neighbor cell. The first network node 111, the second network node 112 and the wireless device 130 operate in the wireless communications network 100.

In some embodiments all the actions may be performed. In some embodiments, one or more actions may be performed. One or more embodiments may be combined, where applicable. All possible combinations are not described to simplify the description. In FIG. 3, optional actions are indicated with dashed lines. Some actions may be performed in a different order than that shown in FIG. 3. It should be noted that the examples herein are not mutually exclusive. Components from one example may be tacitly assumed to be present in another example and it will be obvious to a person skilled in the art how those components may be used in the other examples.

Action 301

Embodiments herein may be understood to aim at improving cell selection by improving a process of comparing the quality of a neighbor cell, such as the second cell 122, with that of a current serving cell, such as the first cell 121.

Embodiments herein may be understood to take into account the differences in beamforming gain between the three beamforming configurations that may be used in a cell.

A beamforming configuration may be understood as, for example, an indication of e.g., how narrow beams a cell may produce or may be used by this cell. This may depend on the number of antenna elements the particular cell has, that is the hardware. Using too narrow beams may increase the overhead, since more beams may be needed to cover an area, meaning more reference signals may need to be provided for the wireless device 130 to measure on those beams. For example, a beamforming configuration may be understood to comprise a set of precoding weight factors, one for each antenna element, that the signal may be multiplied by, before it may be fed to an antenna element. These weight factors may be complex numbers, which may give them the ability to modify both the amplitude and the phase of the signal. By carefully choosing these weight factors, different beam forms, and beam directions may be achieved. As an example, using the phase-shifting ability of complex weights may be used to realize linear inter-antenna element phase shifts, which may cause the transmitted signal to be amplified in a certain direction, or in a few directions—typically with stronger amplification in one direction and weaker amplification in a few other directions, often referred to as sidelobes.

The three beamforming configurations that may be used in a cell may be:

a) The beamforming configuration that may be used for transmission of the DL signal(s), e.g., NR-PSS+NR-SSS or SS Block or some other reference signal, the wireless device 130 may be measuring on when performing its cell reselection assessments. This configuration may be referred to herein as a first configuration;

b) The beamforming configuration that may be used when the wireless device 130 may be paged; This configuration may be referred to herein as a first example of a second configuration.

c) The beamforming configuration that may be used when the UE may be communicating in RRC_CONNECTED state, that is, beamforming tailored for the wireless device 130. This configuration may be referred to herein as a second example of the second configuration. This configuration may be also be referred to herein as a third configuration According to the foregoing, each of the first cell 121 and the second cell 122 has a first beamforming configuration for a first use corresponding to a first beam gain, e.g., $BG_M$, and a second beamforming configuration for a second use corresponding to a second beam gain, e.g., $BG_P$, or $BG_C$. Beam gain (BG), a.k.a. Beamforming gain, may be understood as a gain that may be achieved by directing an energy of a signal in a specific direction, compared to sending the signal uniformly in all directions. It may, for instance, be expressed as a received signal strength of a beamformed signal, e.g., a reference signal, divided by the signal strength of the signal, e.g., the reference signal, non-beamformed. Beam gain may for instance be expressed in Decibels (dB). The beam gain may be applied both to transmitted and received signals. In the latter case, the receiver may achieve the beam gain by listening in a specific direction and ignoring signals from other directions. The beam gain may also be calculated by dividing the area covered by a non-beamformed signal with the area that is covered by the beamformed signals. The smaller the area the beamformed signals cover, the stronger the signal that will be provided in the covered area.

To assist in the reading of embodiments herein, the first beam gain will be referred to as first beam gain $BG_M$, although this may be understood to be a non-limiting example of the first beam gain. Similarly, the second beam gain will be referred to as second beam gain $BG_P$, $BG_C$, although these may be understood to be a non-limiting examples of the second beam gain.

In some embodiments, a) the first use may be transmission of one or more downlink, DL, signals, and b) the second use may be one of: i) paging the wireless device 130, and ii) communicating with the wireless device 130 in a connected state, e.g., RRC_CONNECTED state.

That each of the first cell 121 and the second cell 122 has the first beamforming configuration and the second beamforming configuration may be understood as that each of the first cell 121 and the second cell 122 has a respective first beamforming configuration and a respective second beamforming configuration. That is, the first cell 121 may have a first first beamforming configuration and a first second beamforming configuration, and the second cell 122 may have a second first beamforming configuration and a second second beamforming configuration. In some examples, at least two of the: first first beamforming configuration, first second beamforming configuration, second first beamforming configuration and second second beamforming configuration may be the same. In some examples at least two of the: first first beamforming configuration, first second beamforming configuration, second first beamforming configuration and second second beamforming configuration may be different. In some examples, at least one of the first beamforming configuration and the second beamforming configuration may be different between the first cell 121 and the second cell 122.

This may be accounted for by creating a measure for the gain of each of the two latter beamforming configurations in relation to the gain of the beamforming configuration used for the DL signal the wireless device 130 may measure on. A suitable such measure may be the beamforming gain ratio, or beam gain ratio, which may preferably be expressed in decibel (dB), but may optionally be expressed as a pure, that is, unitless, amplification/gain ratio. To this end, and for the purpose of the further description of the embodiments herein, $BG_M$ denotes herein the beamforming gain achieved with the beamforming configuration used for transmissions of the signal(s) the wireless device 130 may measure on, e.g., NR-PSS+NR-SSS or SS Block or some other reference signal; $BG_P$ denotes herein the beamforming gain achieved with the beamforming configuration used for paging, and $BG_C$ denotes herein the beamforming gain achieved with the beamforming configuration used for DL transmission when the wireless device 130 is communicating in RRC_CONNECTED state, that is beamforming tailored for the wireless device 130. Furthermore, $BGR_{P/M}$ denotes herein the Beamforming Gain Ratio (BGR), a.k.a. Beam gain ratio, between the gain achieved with the beamforming configuration used for paging and the gain achieved with the beamforming configuration used for transmissions of the signal(s) the wireless device 130 measures on, i.e. $BGR_{P/M}=BG_P/BG_M$. Similarly, $BGR_{C/M}$ denotes herein the beamforming gain ratio between the gain achieved with the beamforming configuration used for DL transmission when the wireless device 130 may be communicating in RRC_CONNECTED state, i.e., beamforming tailored for the wireless device 130, and the gain achieved with the beamforming configuration used for transmissions of the signal(s) the wireless device 130 may measure on, i.e. $BGR_{C/M}=BG_C/BG_M$.

Accordingly, in this Action 301, the first network node 111 obtains, for each of the first cell 121 and the second cell 122, a first indication of the second beam gain in relation to the first beam gain. The first indication is cell-specific. According to the foregoing, the first network node 111 may obtain, e.g., a first indication for the first cell 121, and a first indication for the second cell 122.

An indication may be understood herein as any of a variable or a value or code, in e.g., a field or a set of one or more bits in a set of time-frequency resource, as applicable depending on the context.

In some embodiments, the first indication may be a first ratio, e.g., $BGR_{P/M}$, or $BGR_{C/M}$, between the second gain, $BG_P$, or $BG_C$, and the first gain, e.g., $BG_M$. To assist in the reading of embodiments herein, the first ratio will be referred to as first ratio $BGR_{P/M}$, $BGR_{C/M}$, although these may be understood to be a non-limiting examples of the first ratio.

Obtaining may be understood as any of: determining, calculating, retrieving from a memory, or receiving from another network node, e.g., the second network node 112 or the third network node 113. In some embodiments, the second cell 122 may be served by the third network node 113 operating in the wireless communications network 100, and the first indication $BGR_{P/M}$, $BGR_{C/M}$ for the second cell 122 may obtained by receiving the first indication for the second cell 122 from the third network node 113 e.g., over the third link 143, or the fifth link 145, or from another network node operating in the wireless communications network 100.

In some particular embodiments, the first indication may be received from the third network node 113 comprised in a response to a request from the second network node 112 to activate transmission of downlink signals.

Action 302

If one of the beamforming gain ratios differs between two cells such as the first cell 121 and the second cell 122, then the measurement the wireless device 130 may perform, e.g., on the NR-PSS+NR-SSS or SS Block or some other reference signal, on the two cells will not be comparable, since they reflect the situation after a possible cell reselection in different ways. For instance, if the measurements on two such cells yield equal measurement results, then the cell with the higher beamforming gain ratio, e.g. higher $BGR_{P/M}$, may in fact be a better cell in terms of better reachability for paging.

To overcome this problem, as a first step, Cell Specific Offsets (CSOs) may be used in embodiments herein to compensate for the differences in beam gain ratio. The operator then may have to determine whether the prime purpose of camping is to be reachable for paging, or to be prepared for accessing and communicating via the cell, that is, whether to optimize the cell reselection information in the system information for paging, or RRC_CONNECTED state communication. This choice may determine whether the CSO compensates for the difference in $BGR_{P/M}$ or the difference in $BGR_{C/M}$.

For instance, an example may be considered where a certain cell, C1, has two neighbor cells, C2 and C3, and the network operator optimizes the cell reselection information for paging. The three cells have respectively the following beam gain ratios for paging in relation to measurement signal(s) transmissions:

C1: $BGR_{P/M-C1}=X_{C1}$ dB

C2: $BGR_{P/M-C2}=X_{C2}$ dB

C3: $BGR_{P/M-C3}=X_{C3}$ dB

In the system information, broadcast or conveyed through dedicated signaling, of C1, the network may include a CSO for each of its neighbor cells C2 and C3 to compensate for the differences in beam gain ratio. Hence, for neighbor cell C2, the CSO is set to $CSO_{1\_2}=X_{C2}-X_{C1}$ dB, and for neighbor cell C3 the CSO is set to $CSO_{1\_3}=X_{C3}-X_{C1}$ dB. A network, e.g., operator, may also have other reasons for assigning a CSO for a neighbor cell. The compensation for differences in beam gain ratios may then added to the original CSO.

To provide a better understanding of the rationale behind this Action 302 by the first network node 111, understanding the behavior of the wireless device 130 may be useful. When the wireless device 130 in RRC_IDLE or RRC_INACTIVE state, which is camping on cell C1, e.g., the first cell 121, measures on the measurement signal(s), e.g., NR-PSS+NR-SSS or SS Block or some other reference signal, of C1 and C2 for the purpose of assessing the suitability of C2, e.g., the second cell 122, for cell reselection, the wireless device 130 may add $CSO_{1\_2}$ to the measurement result of C2, e.g., $M_{2\text{-}Compensated}=M_2+CSO_{1\_2}$ before comparing it with the measurement result of C1, e.g., denoted $M_1$. Likewise, if the wireless device 130 camping on C1 measures on C3 and C1 for the purpose of assessing the suitability of C3 for cell reselection, the wireless device 130 may add $CSO_{1\_3}$ to the measurement result of C3, i.e. $M_{3\text{-}Compensated}=M_3+CSO_{1\_3}$ before comparing it with the measurement result of C1, e.g., $M_1$. The wireless device 130 camping on C1 may also use the compensated measurement results, $M_{2\text{-}Compensated}$ and $M_{3\text{-}Compensated}$, when comparing C2 and C3 with each other, e.g., to determine which one of them that is the best for cell reselection.

All the above calculations may be understood to assume that all quantities are expressed in dB. If this is not the case, but, for instance, the measurement results are expressed in a non-logarithmic unit, such as watt (W), then the beam gain ratios may also have to be non-logarithmically expressed, that is, unitless values, and the CSOs may have to be replaced by Cell Specific Factors (CSF), which the wireless device 130 in RRC_IDLE or RRC_INACTIVE state may multiply the measurement result of the concerned cell by before comparing it with that of another cell. Throughout these alternative non-logarithmic calculations, the suffix "NL" (e.g. $M_{1\text{-}NL}$) indicates "non-logarithmic". Then, the CSF for C2 provided in the system information of C1, that is, $CSF_{1\_2}$, may be calculated as $CSF_{1\_2}=BGR_{P/M\text{-}C2\text{-}NL}/BGR_{P/M\text{-}C1\text{-}NL}$, and the corresponding CSF for C3 may be calculated as $CSF_{1\_3}=BGR_{P/M\text{-}C3\text{-}NL}/BGR_{P/M\text{-}C1\text{-}NL}$. When the wireless device 130 in RRC_IDLE or RRC_INACTIVE state, which is camping on cell C1, measures on the measurement signal(s), e.g., NR-PSS+NR-SSS or SS Block or some other reference signal, of C1 and C2 for the purpose of assessing the suitability of C2 for cell reselection, the wireless device 130 may multiply the measurement result of C2 by $CSF_{1\rightarrow 2}$, that is, $M_{2\text{-}Compensated\text{-}NL}=M_{2\text{-}NL}\times CSF_{1\rightarrow 2}$, before comparing it with the measurement result of C1, e.g., denoted $M_{1\text{-}NL}$. Likewise, when the wireless device 130 in RRC_IDLE or RRC_INACTIVE state, which is camping on cell C1, measures on the measurement signal(s) of C1 and C3 for the purpose of assessing the suitability of C3 for cell reselection, the wireless device 130 may multiply the measurement result of C3 by $CSF_{1\_3}$, that is, $M_{3\text{-}Compensated\text{-}NL}=M_{3\text{-}NL}\times CSF_{1\_3}$, before comparing it with the measurement result of C1 that is, $M_{1\text{-}NL}$. The wireless device 130 camping on C1 may also use the compensated measurement results, $M_{2\text{-}Compensated\text{-}NL}$ and $M_{3\text{-}Compensated\text{-}NL}$, when comparing C2 and C3 with each other, e.g., to determine which one of them that is the best for cell reselection.

According to the foregoing, in this Action 302, the first network node 111 determines, based on the first indication $BGR_{P/M}$, $BGR_{C/M}$ obtained for each of the first cell 121 and the second cell 122, a first value, e.g., any of CSO, CSF, to be applied in a first cell selection procedure between the first cell 121 and the second cell 122.

The first value may be referred to as a first parameter for cell selection. To assist in the reading of embodiments herein, the first value will be referred to as first value CSO, CSF, although these may be understood to be non-limiting examples of the first value.

To be applied in a cell selection procedure may be understood as, e.g., to be used in the "ranking" of different candidate cells. Specific examples are provided in the detailed description.

Determining may be understood as e.g., calculating.

The first value may be used to make an estimation of a quality of a signal transmitted using the second beamforming configuration based on measurements performed on a signal transmitted using the first beamforming configuration in the second cell 122 comparable with the corresponding estimation in the first cell 121.

In some embodiments, the determining 302 of the first value CSO, CSF may be further based on the second use in the second cell 122.

Action 303

The use of CSOs, or CSRs, may be considered an efficient way of compensating for differences in beam gain ratios. However, CSOs, or CSRs, may require configuration in each gNB, that is, configuration of the differences in beam gain ratios in CSOs for all neighbor cells of all the cells served by the first network node 111, e.g., a gNB. This is a demanding and potentially quite costly task, which may have to be performed every time a cell or gNB is deployed in the network, or removed from the network, or when beam gain ratios or cell neighbor relations change. To eliminate this problematic task, embodiments herein may comprise, as a next step, that neighbor network nodes, e.g., gNBs, exchange beam gain ratios for their respective cell(s) with each other, in order to support automatic configuration of CSOs, or CSFs. To this end, for a certain one of its cell(s), e.g., C1, the first network node 111 may transfer either $BGR_{P/M\text{-}C1}$, or $BGR_{P/M\text{-}C1\text{-}NL}$, or $BGR_{C/M\text{-}C1}$, or $BGR_{C/M\text{-}C1\text{-}NL}$, or both of them, to each gNB that serves a cell that is a neighbor of the concerned cell (C1), e.g., to the third network node 113 serving the second cell 122.

This information exchange between neighboring network nodes, or gNBs, may preferably be performed across an inter-gNB interface, or other inter-RAN node interface, such as eX2, but it may also be done via the core network, e.g. via the S1 interfaces and possibly an inter-MME interface, in case the two concerned gNBs are not connected to the same MME, or corresponding core network node. Yet another possibility is that the information exchange takes place via a, possibly (semi-)centralized, RAN controller node, or that the beam gain ratio information may be inherently available in RAN controller nodes, which may exchange this information across an inter-RAN controller node interface. eX2 may be understood as a term used herein for the enhanced version of X2 to be used in NR. S1 may be understood as the interface between the RAN and the core network in LTE, e.g., between an eNB and an EPC MME, or 5G, e.g., between a gNB and a NGC MME. X2 may be understood as the interface between two eNBs in LTE.

The beam gain ratio information may be preferably exchanged between gNBs, or other RAN nodes, when the inter-gNB interface, or inter-RAN node interface, is established, e.g., as new parameters in the X2 SETUP REQUEST and X2 SETUP RESPONSE messages, and when any relevant updates may occur. Optionally, a gNB may also be able to request beam gain ratio information from a neighbor gNB.

According to the foregoing, in this Action 303, the first network node 111 initiates sending at least one of: i) a second indication of the determined first value CSO, CSF, and ii) a third indication of the obtained first indication, to at least one of: the wireless device 130, the second network node 112, and a third network node 113 operating in the wireless communications network 100. Table 1 below provides an overview of the different indications mentioned herein to facilitate the reading of this disclosure.

Initiating may be understood as starting the performance of, or as causing, enabling or triggering another network node to perform, in this case, the sending.

The sending may be performed over any of the first link 141, the third link 143, the fourth link 144 or the fifth link 145, as applicable. The at least one of the second indication and the third indication may be sent in system information, broadcast or through dedicated signalling, e.g., RRC or another protocol.

As stated earlier, the first network node 111 and the second network node 112 may be at least one of: a) a same network node and b) different network nodes.

Action 304

It is still not decided in 3GPP what DL signal(s) a UE in RRC_CONNECTED state will measure on and report to its serving cell/gNB for support of handover decisions. One alternative may be that the UE uses the same signal(s) as for cell reselection in RRC_IDLE and RRC_INACTIVE state. If this is the case, then the first network node 111 may use the received beam gain ratios and configured CSOs, or CSFs, to compensate the neighbor cell measurement results the wireless device 130 may report, when assessing the suitability of the reported neighbor cell, e.g., the second cell 122, as a handover target, or assessing whether a handover should at all be performed. Alternatively, the wireless device 130 may itself use the beam gain ratios or CSOs, or CSFs, to compensate the measurement results before it may report them to its serving cell/gNB, the first network node 111. See the description of Action 504 for this later point.

If other DL signal(s), e.g., Mobility Reference Signals (MRS), are used for neighbor cell measurements in RRC_CONNECTED state, then beam gain ratios for RRC_CONNECTED state communication beam gains, that is, beam gains for beams tailored for the wireless device 130, in relation to DL measurement signals, e.g., MRS, transmission beam gains, may be exchanged between gNBs in a similar way as described above for the beam gain ratios that may be relevant for RRC_IDLE and RRC_INACTIVE state measurements. The gNBs may then use such received beam gain ratios in their handover and target cell suitability assessment. Optionally, the first network node 111 may also, or instead, configure RRC_CONNECTED state CSOs, or CSFs, or beam gain ratios, and include them in the system information or signal them to the wireless device 130, or UEs, in RRC_CONNECTED state using dedicated signaling, so that the wireless device 130 may use this information to compensate the neighbor cell measurement results before reporting them to the serving cell/gNB.

It may be noted that CSOs, or CSFs or beam gain ratios, for RRC_CONNECTED state neighbor cell measurements may be used in parallel with CSOs, or CSFs or beam gain ratios, for RRC_IDLE or RRC_INACTIVE state cell reselection measurements. It may also be noted that the CSOs, or CSFs or beam gain ratios, to be used in RRC_CONNECTED state may be different from the CSOs, or CSFs or beam gain ratios, to be used in RRC_IDLE or RRC_INACTIVE state, e.g., if different DL signals with different beamforming configurations may be used for RRC_CONNECTED state neighbor cell measurements than for cell reselection measurements in RRC_IDLE or RRC_INACTIVE state. In such a case, the wireless device 130 may be configured, e.g., via the system information, with two different types of CSOs, or CSFs or beam gain ratios. Furthermore, if the wireless device 130, as e.g., described in the section entitled "Flexible Choice between Paging and RRC_CONNECTED State Optimization", may in addition, be configured with two types of CSOs, or CSFs, for RRC_IDLE and RRC_INACTIVE state—one type targeting paging optimization and one type targeting RRC_CONNECTED state optimization—then, when adding the CSO, or CSF or beam gain ratio, type for RRC_CONNECTED state, the wireless device 130 may be configured with three types of CSOs, or CSFs or beam gain ratios, where the UE may choose which one of the two to apply in RRC_IDLE and RRC_INACTIVE state, while the third one is to be applied in RRC_CONNECTED state.

According to the foregoing, in some embodiments, each of the first cell 121 and the second cell 122 may have a third beamforming configuration for a third use corresponding to a third beam gain, e.g., any of $BG_P$, $BG_C$. In such embodiments, the obtaining 301 may further comprise obtaining, for each of the first cell 121 and the second cell 122, a fourth indication, e.g., any of $BGR_{P/M}$, $BGR_{C/M}$, of the third beam gain $BG_P$, $BG_C$ in relation to the first beam gain $BG_M$. The fourth indication may be cell-specific. The determining 302 may further comprise determining, based on the fourth indication $BGR_{P/M}$, $BGR_{C/M}$ obtained for each of the first cell 121 and the second cell 122, a second value, e.g., any of CSO, CSF, to be applied in a second cell selection procedure between the first cell 121 and the second cell 122. The initiating 303 sending may comprise initiating sending a fifth indication of the second value to the at least one of: the wireless device 130, the second network node 112, and the third network node 113.

To assist in the reading of embodiments herein, the third beam gain will be referred to as third beam gain $BG_P$, $BG_C$, although these may be understood to be non-limiting examples of the third beam gain. Similarly, the fourth indication may be referred to as the fourth indication $BGR_{P/M}$, $BGR_{C/M}$, and the second value will be referred to as second value CSO, CSF, although these may be understood to be non-limiting examples of the fourth indication, and second value, respectively.

The second value may be referred to as a second parameter for cell selection.

Initiating may be understood as starting the performance of, or as causing, enabling or triggering another network node to perform, in this case, the sending. The fifth indication may be sent in system information, broadcast or through dedicated signalling, e.g., RRC or another protocol.

In this Action 304, the first network node 111 may apply at least one of: i) the determined first value CSO, CSF in the first cell selection procedure between the first cell 121 and the second cell 122, and ii) the determined second value CSO, CSF in the second cell selection procedure between the first cell 121 and the second cell 122.

Applying may comprise, for example, adding, subtracting, or multiplying, as explained earlier with specific examples. In particular, some embodiments herein may relate to applying embodiments herein for RRC_CONNECTED state handover decisions. Further details on these embodiments are provided in a section entitled "a) Applying embodiments herein for RRC_CONNECTED State Handover Decisions" further down below.

By performing this Action 304, the first network node 111 may be enabled to more appropriately compare the first cell 121 and the second cell 122 to determine which one of them that is the best for cell selection, based on the main use the wireless device 130 may make of the potentially selected cell, e.g., paging, communication under connected state, or measurement.

The first cell selection procedure and the second cell selection procedure may be understood herein to refer to either a) a same cell selection procedure, but using different input data, taking into consideration the three different uses, or to b) two different cell selection procedures that may exist in parallel or be performed serially, wherein a first pair of uses is taken into consideration for the first cell selection procedure, and a second pair of uses is taken into consideration for the second cell selection procedure.

The first network node 111 may autonomously configure, or modify, CSOs, or CSFs, in accordance with the received beam gain ratio information, and knowledge of the beam gain relations of its own cell(s). A way to do this may be to add the beam gain ratio difference to the existing CSO, or create a new one if none existed for that neighbor cell before, as described above. In case CSFs are used, an existing CSF may be multiplied by the ratio between the beam gain ratios, or a new CSF may be created if none existed for that neighbor cell before, as described above. Creating a new CSO may be understood as adding the beam gain ratio difference to an existing CSO=0 dB. Creating a new CSF may be understood as multiplying the ratio between the beam gain ratios by an existing CSF=1.

Figure 4:
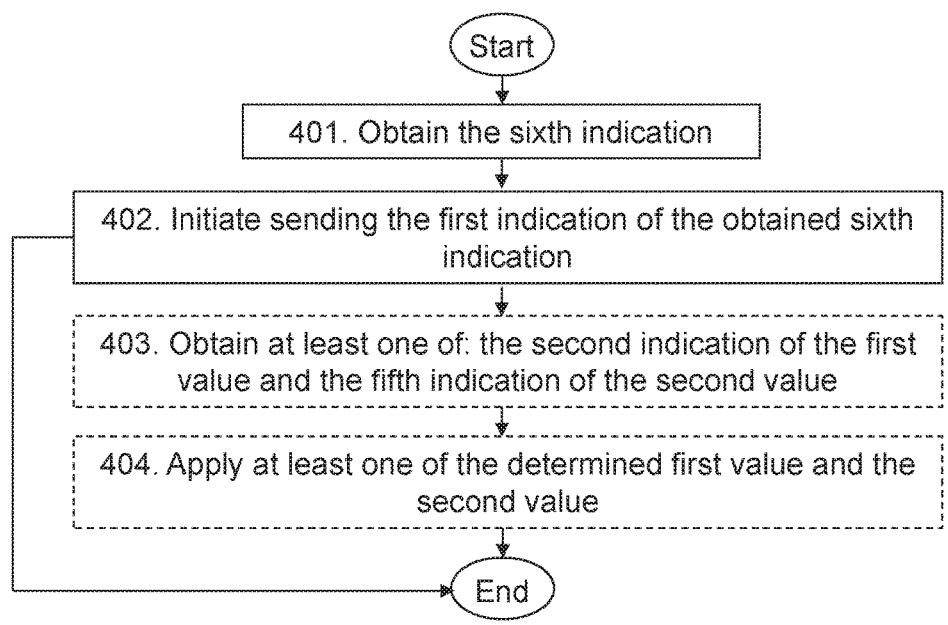
FIG. 4 is a flowchart depicting embodiments of a method in a third network node, according to embodiments herein.

Embodiments of a method performed by the third network node 113, will now be described with reference to the flowchart depicted in FIG. 4. The method may be understood to be for facilitating cell selection. The third network node 113 serves the second cell 122 with beamforming. The second cell 122 has the first beamforming configuration for the first use corresponding to the first beam gain $BG_M$, and the second beamforming configuration for the second use corresponding to the second beam gain $BG_P$, $BG_C$. The third network node 113 operates in the wireless communications network 100.

The second cell 122 may be neighbor to the first cell 121 served by the second network node 112. Each of the first cell 121 and the second cell 122 may have the first beamforming configuration for the first use corresponding to the first beam gain $BG_M$, and the second beamforming configuration for the second use corresponding to the second beam gain $BG_P$, $BG_C$.

The method may comprise one or more of the following actions. In some embodiments all the actions may be performed. In some embodiments, one or more actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 4, optional actions are indicated with dashed lines. Some actions may be performed in a different order than that shown in FIG. 4.

The detailed description of some of the following corresponds to the same references provided above, in relation to the actions described for the first network node 111, and will thus not be repeated here to simplify the description. For example, a) the first use may be transmission of one or more downlink, DL, signals, and b) the second use may be one of: i) paging the wireless device 130, and ii) communicating with the wireless device 130 in the connected state, e.g., RRC_CONNECTED state.

Action 401

The third network node 113 in this Action 401, obtains, for the second cell 122, a sixth indication, e.g., any of $BGR_{P/M}$, $BGR_{C/M}$ of the second beam gain $BG_P$, $BG_C$ in relation to the first beam gain $BG_M$. The sixth indication is cell-specific.

In some embodiments, the sixth indication may be the first ratio $BGR_{P/M}$, $BGR_{C/M}$ between the second beam gain $BG_P$, $BG_C$ and the first beam gain $BG_M$. To assist in the reading of embodiments herein, the sixth indication will be referred to as sixth indication $BGR_{P/M}$, $BGR_{C/M}$ although these may be understood to be non-limiting examples of the sixth indication.

The third network node 113 may obtain the sixth indication similarly to how the first network node 111 obtains the first indication in Action 301. Therefore, a description of how the obtaining may be performed in this Action 401 will not be repeated here. In fact, it may be understood that the first network node 111 may obtain the first indication for the second cell 122 by receiving the sixth indication. That is, the first indication and the sixth indication may be the same in some examples.

Action 402

To exchange of beam gain ratio information, e.g. $BGR_{P/M}$ and/or $BGR_{C/M}$ between network nodes, and use of this information to configure cell specific offsets (CSOs), or cell specific factors (CSFs), which the wireless device 130 may then apply to neighbor cell measurements during cell reselection assessments, the third network node 113, in this Action 402 initiates sending the first indication of the obtained sixth indication $BGR_{P/M}$, $BGR_{C/M}$ to at least one of: the second network node 112 operating in the wireless communications network 100, wherein the second cell 122 is a neighbor to the first cell 121 served by the second network node 122, the wireless device 130 served by the second network node 112, and the first network node 111 operating in the wireless communications network 100.

Initiating may be understood as starting the performance of, or as causing, enabling or triggering another network node to perform, in this case, the sending. The first indication may be sent in system information, broadcast or through dedicated signalling, e.g., RRC or another protocol.

In one of the embodiments, the first network node 111 may therefore obtain the first indication that the third network node 113 initiates sending in this Action 402.

In some embodiments, the first indication may be sent by the third network node 113, comprised in the response to the request from the second network node 112 to activate transmission of downlink signals.

In some embodiments, each of the first cell 121 and the second cell 122 may have the third beamforming configuration for the third use corresponding to the third beam gain $BG_P$, $BG_C$. In such embodiments, the obtaining in Action 401 may further comprise obtaining, for each of the first cell 121 and the second cell 122, a fourth indication, e.g., any of $BGR_{P/M}$, $BGR_{C/M}$ of the third beam gain $BG_P$, $BG_C$ in relation to the first beam gain $BG_M$. The fourth indication may be cell-specific. The initiating 402 sending may further comprise initiating sending a seventh indication of the fourth indication $BGR_{P/M}$, $BGR_{C/M}$ to at least one of: the second network node 112, the wireless device 130 and the first network node 111. To assist in the reading of embodiments herein, the fourth indication will be referred to as sixth indication $BGR_{P/M}$, $BGR_{C/M}$ although these may be understood to be non-limiting examples of the fourth indication.

The seventh indication may be sent in system information, broadcast or through dedicated signalling, e.g., RRC or another protocol. In fact, it may be understood that the first network node 111 may obtain the fourth indication for the second cell 122 by receiving the seventh indication. That is, the seventh indication may be the same as the fourth indication, in some examples.

Action 403

In this Action 403, the third network node 113 obtains at least one of: i) the second indication of the first value CSO, CSF to be applied in the first cell selection procedure between the first cell 121 and the second cell 122, the obtaining 403 of the second indication being based on the first indication $BGR_{P/M}$, $BGR_{C/M}$ obtained for each of the first cell 121 and the second cell 122, and ii) the fifth indication of a second value CSO, CSF to be applied in the second cell selection procedure between the first cell 121 and the second cell 122, the obtaining 403 of the fifth indication being based on the fourth indication $BGR_{P/M}$, $BGR_{C/M}$ obtained for each of the first cell 121 and the second cell 122.

Obtaining in this Action 403 may comprise receiving the second indication and the fifth indication that the first network node 111 may have initiated sending in Action 303.

In some embodiments, the initiating sending in Action 402 may further comprise initiating sending at least one of the obtained second indication and the obtained fifth indication to at least one of: the second network node 112, the wireless device 130, and the first network node 111.

The at least one of the second indication and the fifth indication may be sent in system information, broadcast or through dedicated signalling, e.g., RRC or another protocol.

Action 404

In order to enable cells with different beamforming configurations, particularly in terms of the beamforming gain, to coexist, and still allow consistent and comparable cell reselection measurements and assessments, the third network node 113 may, in this Action 404, apply at least one of: i) the determined first value CSO, CSF in the first cell selection procedure between the first cell 121 and the second cell 122, and ii) the second value CSO, CSF in the second cell selection procedure between the first cell 121 and the second cell 122.

Applying may comprise, for example, adding, subtracting, or multiplying, as explained earlier with specific examples.

The third network node 113 may perform this Action 404 similarly to how the first network node 111 may perform Action 304. Therefore, a description of how the obtaining may be performed in this Action 404 will not be repeated here.

Figure 5:
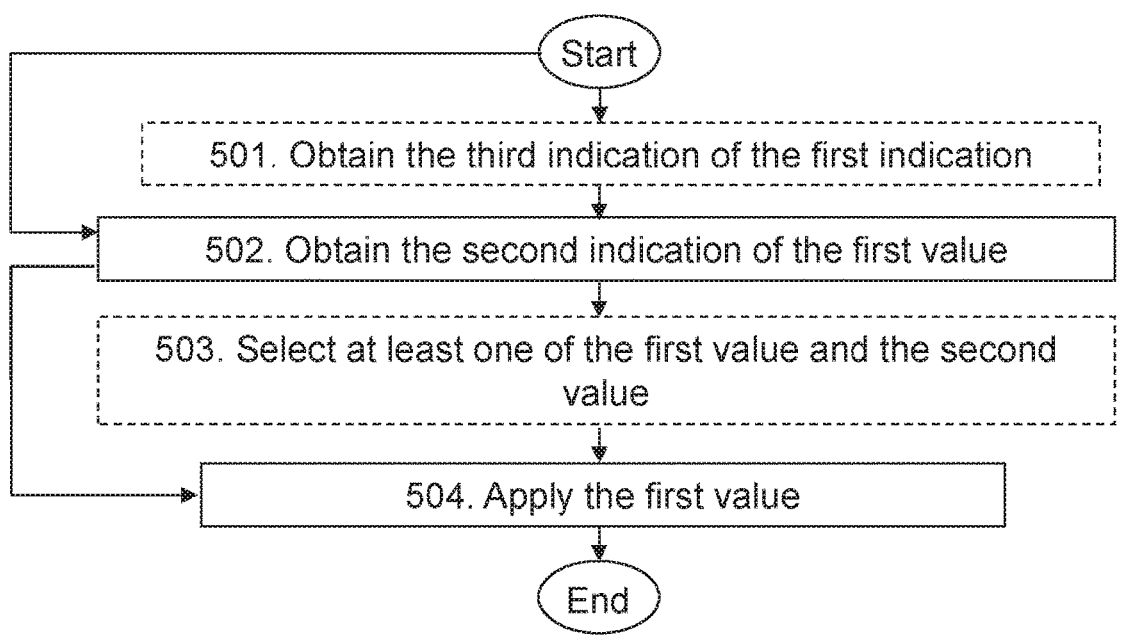
FIG. 5 is a flowchart depicting embodiments of a method in a wireless device, according to embodiments herein.

Embodiments of a method performed by the wireless device 130, will now be described with reference to the flowchart depicted in FIG. 5. The method may be understood to be for facilitating cell selection. The wireless device 130 is served by the second network node 112 with beamforming in the first cell 121. The first cell 121 has the second cell 122 as a neighbor cell. Each of the first cell 121 and the second cell 122 have the first beamforming configuration for the first use corresponding to the first beam gain $BG_M$, and the second beamforming configuration for the second use corresponding to the second beam gain $BG_P$, $BG_C$. The wireless device 130 and the second network node 112 operate in the wireless communications network 100.

The method may comprise one or more of the following actions. In some embodiments all the actions may be performed. In some embodiments, one or more actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 5, optional actions are indicated with dashed lines. Some actions may be performed in a different order than that shown in FIG. 5.

The detailed description of some of the following corresponds to the same references provided above, in relation to the actions described for the first network node 111, and will thus not be repeated here to simplify the description. For example, a) the first use may be transmission of one or more downlink, DL, signals, and b) the second use may be one of: i) paging the wireless device 130, and ii) communicating with the wireless device 130 in the connected state, e.g., RRC_CONNECTED state.

Action 501

The wireless device 130 may, in this Action 501, obtain, for each of the first cell 121 and the second cell 122, the third indication of the first indication, from at least one of: the first network node 111 operating in the wireless communications network 100, the first network node 111 being connected to the second network node 112, and the third network node 113.

Obtaining may be understood in this Action 501, as e.g., receiving.

In some embodiments, the third indication may be obtained by receiving broadcasted system information or dedicated signalling.

In some embodiments, each of the first cell 121 and the second cell 122 may have the third beamforming configuration for the third use corresponding to the third beam gain $BG_P$, $BG_C$. In such embodiments, the obtaining 501 may further comprise obtaining, for each of the first cell 121 and the second cell 122, the fourth indication $BGR_{P/M}$, $BGR_{C/M}$ of the third beam gain $BG_P$, $BG_C$ in relation to the first beam gain $BG_M$. The fourth indication may be cell-specific Action 502

To enable the wireless device 130 to perform consistent and comparable cell reselection measurements and assessments, the wireless device 130, in this Action 502 obtains the second indication of the first value CSO, CSF to be applied in the first cell selection procedure between the first cell 121 and the second cell 122. The first value is based on the first indication $BGR_{P/M}$, $BGR_{C/M}$, for each of the first cell 121 and the second cell 122, of the second beam gain $BG_P$, $BG_C$ in relation to the first beam gain $BG_M$. The first indication is cell-specific.

Obtaining in this Action 502 may be understood as, e.g., receiving, calculating, deriving, determining or retrieving from e.g., a memory. The second indication may be received in system information, broadcast or through dedicated signalling, e.g., RRC or another protocol.

In some embodiments, the first value CSO, CSF may be further based on the second use in the second cell 122.

The first indication may be the first ratio $BGRP_{P/M}$, $BGRP_{C/M}$ between the second gain $BG_P$, $BG_C$ and the first gain $BG_M$.

Action 503

As stated earlier, in some embodiments, each of the first cell 121 and the second cell 122 may have the third beamforming configuration for the third use corresponding to the third beam gain $BG_P$, $BG_C$. In such embodiments, the obtaining in Action 502 may further comprise obtaining, based on the fourth indication $BGR_{P/M}$, $BGR_{C/M}$ of the third beam gain $BG_P$, $BG_C$ in relation to the first beam gain $BG_M$ obtained for each of the first cell 121 and the second cell 122, the second value CSO, CSF to be applied in the second cell selection procedure between the first cell 121 and the second cell 122. The fourth indication may be cell-specific. In some of such embodiments, the wireless device 130 may in this Action 503, select at least one of: i) the first value CSO, CSF for application in the first cell selection procedure between the first cell 121 and the second cell 122, and ii) the second value CSO, CSF for application in the second cell selection procedure between the first cell 121 and the second cell 122.

Action 504

In order to enable cells with different beamforming configurations, particularly in terms of the beamforming gain, to coexist, and still allow consistent and comparable cell reselection measurements and assessments, the wireless device 130 may, in this Action 504, apply the first value CSO, CSF to the first cell selection procedure between the first cell 121 and the second cell 122.

Applying may comprise, for example, adding, subtracting, or multiplying, as explained earlier with specific examples.

In some embodiments, the applying 504 of the first value CSO, CSF to the cell selection procedure between the first cell 121 and the second cell 122 may be performed before reporting measurement results in the second cell 122 to the second network node 112. An advantage of this approach may be that the reporting behavior of the wireless device 130 may become more appropriate, due to more accurate report triggering, so that some redundant reports, that is, where the wireless device 130 may actually not be close to a handover situation, may be avoided, and it may be avoided that the wireless device 130 fails to report in cases where a handover may actually be considered. The latter problem, that is, failing to report when it may be appropriate, may otherwise be dealt with by configuring the wireless device 130 with very generous report triggering conditions, but that may on the other hand also result in an excess amount of redundant reports.

In some embodiments, the applying in this Action 504 of the first value CSO, CSF to the cell selection procedure between the first cell 121 and the second cell 122 may be performed during multiple measurements without having to obtain the second indication again.

The wireless device 130 may perform this Action 504 similarly to how the first network node 111 may perform Action 304. Therefore, a description of how the obtaining may be performed in this Action 504 will not be repeated here.

Table 1 below summarizes the different indications discussed herein, to facilitate the review of this disclosure. In Table 1:
111 refers to the first network node 111, 112 refers to the second network node 112, 113 refers to the third network node 113, and 130 refers to the wireless device 130;
For each of 121, 122 means for each of the first cell 121 and the second cell 122;
121 means for the first cell 121;
122 means for the second cell 122;
121, 122 means regarding the first cell 121, and the second cell 122;
Rx means obtained, e.g., calculated or received; and
Tx means transmission is initiated to.

It may be understood that if $BGR_{P/M}$ is an example of the third indication, $BGR_{C/M}$ may be an example of the fourth indication. However, it may be understood that, in other embodiments, $BGR_{C/M}$ may be an example of the first indication, and $BGR_{P/M}$ may be an example of the fourth indication. It may be understood from the above that the first indication, may be e.g., a calculated value, that may then be transmitted as the third indication by the first network node 111 or the sixth indication by the third network node 113. However, in some examples, the first indication may be the same as the third indication, or the sixth indication. Similarly, the fourth indication may be transmitted by the third network node 113 as the seventh indication, but they may be the same, in some examples.

As stated earlier, CSO, CSF, $BG_M$, $BG_P$, $BG_C$, $BGRP_{P/M}$, $BGRP_{C/M}$ may be used in this Detailed Description section as reference signs or specific, non-limiting, examples of the terms they follow.

Further Embodiments and Variations a) Applying Embodiments Herein for RRC_CONNECTED State Handover Decisions Further to what has been described above on this subject, a possibility that is yet to be fully explored by 3GPP is the possibility to have on-demand DL signals, e.g., reference signals, for example, transmitted in the form of a beam sweep, to be activated temporarily for the purpose of neighbor cell measurements performed by a UE in RRC_CONNECTED state, for which the network, e.g., the serving or Master, gNB may be considering a handover. Exchanging beam gain ratios, e.g., across an inter-gNB interface, may advantageously be used in conjunction with such an on-demand activation of DL signals too, e.g., to enable more flexible choices of beam gain for the DL signal(s) used for measurements, hence resulting in more flexible beam gain ratios. For instance, the first network node 111 serving the wireless device 130 may include beam gain or beam gain ratio instructions in its request to a neighbor gNB to activate DL signals for RRC_CONNECTED state neighbor cell measurement(s), and/or the neighbor gNB may provide beam gain ratio information together with its acknowledgement of the request to activate DL signals. Some possible options include:

The first network node 111, e.g., a serving gNB, may request a neighbor gNB such as the third network node 113, to activate DL signal(s) for RRC_CONNECTED state neighbor cell measurements, and the neighbor gNB may confirm the request and inform the serving gNB of the beam gain ratio of the DL signal transmission(s) in relation to the beam gain used for page transmissions and/or the beam gain used for DL transmissions using tailored beams in RRC_CONNECTED state.

The first network node 111, e.g., a serving gNB, may instruct the third network node 113 to use a beam gain for the requested DL signal, which may result in a specific beam gain ratio in relation to the beam gain used for page transmissions, e.g., "make sure that the

TABLE 1

| INDICATION | INDICATES | RE: CELL | EXAMPLE | DIRECTION |
|---|---|---|---|---|
| First indication | Second beam gain in relation to first beam gain | For each of 121, 122 | $BGR_{P/M}$ | Rx by 111 |
| Second indication | First value | 121, 122 | CSO, CSF | Tx to 130, 112, 113 |
| Third indication | Obtained first indication | 121, or for each of 121, 122 | $BGR_{P/M}$ | Tx to 130, 112, 113 |
| Fourth indication | Third beam gain in relation to first beam gain | For each of 121, 122 | $BGR_{C/M}$ | Rx by 111, 113, 130 |
| Fifth indication | Second value | 121, 122 | CSO, CSF | Tx to 130, 112, 113 |
| Sixth indication | First indication (Second beam gain in relation to first beam gain) | 122 | $BGR_{P/M}$ | Tx to 130, 111, 112 |
| Seventh indication | Fourth indication (Third beam gain in relation to first beam gain) | 122 | $BGR_{C/M}$ | Tx to 130, 111, 112 | beam gain ratio in relation to page transmission is X dB", and the neighbor gNB may confirm the instruction and act accordingly.

The first network node 111, e.g., a serving gNB, may instruct the third network node 113 to use a beam gain for the requested DL signal, which may result in a specific beam gain ratio in relation to the beam gain used RRC_CONNECTED state DL transmissions with tailored beams, e.g., "make sure that the beam gain ratio in relation to RRC_CONNECTED state DL transmissions is X dB", and the neighbor gNB may confirm the instruction and act accordingly.

The first network node 111, e.g., a serving gNB, may request the third network node 113 to use a beam gain for the requested DL signal, which may result in a specific beam gain ratio in relation to the beam gain used for page transmissions, e.g., "please make sure that the beam gain ratio in relation to page transmission is X dB", and the neighbor gNB may either accept and confirm the request, or may choose to use a beam gain for the DL signal(s) which may result in another beam gain ratio, and may inform the serving gNB of this beam gain ratio, that is, the beam gain ratio that will actually be used.

The first network node 111, e.g., a serving gNB, may request the third network node 113 to use a beam gain for the requested DL signal, which may result in a specific beam gain ratio in relation to the beam gain used RRC_CONNECTED state DL transmissions with tailored beams, e.g., "please make sure that the beam gain ratio in relation to RRC_CONNECTED state DL transmissions is X dB", and the neighbor gNB may either accept and confirm the request or may choose to use a beam gain for the DL signal(s) which may result in another beam gain ratio and may inform the serving gNB of this beam gain ratio, that is, the beam gain ratio that will actually be used.

b) Flexible Choice Between Paging and RRC_CONNECTED State Optimization

A possible option may be that whether to optimize the cell reselection, and camping, for paging reachability or RRC_CONNECTED state communication is flexible and may be decided on a case by case basis. This may require that CSOs, or CSFs, for both paging optimization and RRC_CONNECTED state communication are configured, or may be dynamically created.

In one example, the wireless device 130 may perform this choice itself. CSOs, or CSFs, of both types may be provided in the system information, and the wireless device 130 may decide which ones to apply. The basis for such a decision may include e.g.:

User-defined policies/rules stored in the wireless device 130.

Operator-defined polices/rules stored in the wireless device 130, e.g., preconfigured on the Universal Subscriber Identity Module (USIM) or conveyed via Short Message Service (SMS), Over The Air (OTA) configuration or some other signaling means.

Rules hardcoded by the wireless device 130 manufacturer.

UE category of the wireless device 130.

Subscription information, e.g., stored on the USIM.

Instructions from the network, e.g., per-UE-category-rules conveyed via the system information, or rules based on historic application/traffic statistics where the rules may be transferred to the wireless device 130 via dedicated signaling before the wireless device 130 enters RRC_IDLE or RRC_INCATIVE state.

Currently running applications, and their requirements.

Statistics, as collected by the wireless device 130, of historic application and traffic behavior, e.g., dominance of mobile originated or network originated connections/communication.

Similar flexible choices of CSO, or CSF, type may also be applied in RRC_CONNECTED state, either by the gNB, or a RAN node controlling the gNB, in the handover decision process or by the wireless device 130 before reporting neighbor cell measurement results.

c) Beam Gain Ratios Explicitly Provided for the Current Cell

An, assumedly inferior, alternative to abstracting the beam gain ratio differences into CSOs, or CSFs, may be that each cell broadcasts its own beam gain ratio(s), e.g., $BGR_{P/M}$ and/or $BGR_{C/M}$, or $BGR_{P/M-NL}$ and/or $BGR_{C/M-NL}$, in the system information. The wireless device 130 in RRC_IDLE or RRC_INACTIVE state may receive this information in its current cell, that is, the cell it is camping on, and may also acquire this information from the system information of neighbor cells, possibly only if the DL signal measurements imply that the cell may be suitable for cell reselection, during the cell reselection assessment process. If both types of beam gain ratios, i.e. $BGR_{P/M}$ and $BGR_{C/M}$, or $BGR_{P/M-NL}$ and $BGR_{C/M-NL}$, are provided, the wireless device 130 may itself decide which one to apply when comparing cells, similar to what is described above in section "Flexible Choice between Paging and RRC_CONNECTED State Optimization". If only one type of beam gain ratio is provided, then this may be understood to be the one the wireless device 130 may have to apply.

It may also be possible to apply this scheme to neighbor cell measurements and handover assessments in RRC_CONNECTED state, but this may require that the wireless device 130 reads, at least the relevant parts of, the system information of each neighbor cell it may measure on, which makes application of this variation of embodiments herein less attractive in RRC_CONNECTED state. However, it may not be ruled out, since there may be cases where the wireless device 130 may be located near the cell edge for a long time, possibly being stationary, and therefore it may repeatedly measure on the same neighbor cell(s) multiple times. In such a scenario, the wireless device 130 may only have to acquire the concerned system information parts once—at least for a reasonably long time until it may have to refresh the previously acquired system information—and may then apply the acquired beam gain ratio information during multiple measurements without having to reread the system information.

d) Automatic Learning of Beam Gain Ratio Differences Instead of Exchange of Explicit Information An alternative to exchanging beam gain ratio information between gNBs may be that the first network node 111 may learn this information based on reports from UEs. The wireless device 130, for which this reporting function may have been activated, may estimate beam gain ratios in cells that it visits by measuring the channel quality, e.g. in terms of RSRP or SNR/SINR, for both the DL signal used for measurements, e.g., NR-PSS+NR-SSS or SS Block or some other reference signal, and at least one of the other relevant DL transmissions, that is, paging and/or DL transmissions in RRC_CONNECTED state with a beam tailored for the wireless device 130. The wireless device 130 may not have the chance to perform the necessary measurements in all cells it visits, because the wireless device 130 may pass through many cells without either receiving a page or switching to RRC_CONNECTED state. However, whenever the wireless device 130 may perform the necessary measurements in a cell, it may record the results and store them to be reported to the network later.

The network may activate this function in the wireless device 130 or another UE, e.g., using RRC signaling. The network may also use RRC signaling to request the wireless device 130 to report its recorded and stored data, either in terms of beam gain ratios or in terms of raw channel quality measurement results, which the network may translate into beam gain ratios. An alternative to requesting the reports from the wireless device 130 may be that the network configures the reporting behavior in the wireless device 130 when the function is activated. The wireless device 130 may e.g., be configured to report periodically, or when it has recorded a certain amount of measurement results, e.g., a certain number of beam gain estimates, or a certain number of cells from which measurement data has been recorded.

To summarize the foregoing in other words, embodiments herein may be understood to relate to exchange of beam gain ratio information, e.g. $BGR_{P/M}$ and/or $BGR_{C/M}$, between network nodes, e.g., gNBs, and use of this information to configure cell specific offsets (CSOs), or cell specific factors (CSFs), which a UE in RRC_IDLE or RRC_INACTIVE state may apply to neighbor cell measurements during cell reselection assessments.

For a network node such as the first network node 111, e.g. a first gNB, embodiments herein may relate to:
Transmitting beam gain ratio information, e.g. $BGR_{P/M}$ and/or $BGR_{C/M}$, of its own cell(s) to neighbor gNB(s) serving cells neighboring one or more cell(s) of the first gNB.
Receiving corresponding beam gain ratio information from neighbor gNB(s) serving cells neighboring one or more cell(s) of the first gNB.
Configuring CSO(s), or CSF(s), for the neighboring cell(s).
Conveying the configured CSO(s), or CSF(s), to one or more UEs camping on one of the cell(s) served by the first gNB.

An additional network node method embodiment may be understood to relate to configuring dual CSOs, or CSFs, for a neighbor cell, where one of the CSOs, or CSFs, may be configured to optimize cell reselection for paging reachability, and the other CSO, or CSF, may be configured to optimize cell reselection for subsequent RRC_CONNECTED state communication and to configure the UE with both of these CSOs, or CSFs.

For a UE, embodiments herein may relate to the use of Cell Specific Factors (CSFs).

A UE in RRC_CONNECTED state may receive CSOs, or CSFs, from its serving gNB and apply them to measurement on neighbor cell DL channel quality before possibly reporting the, compensated, measurement result to the gNB. This is an option described in the section entitled "Applying embodiments herein for RRC_CONNECTED State Handover Decisions" and in Action 304.

A UE in RRC_IDLE or RRC_INACTIVE state may receive, e.g., in the system information, two types of CSO(s), or CSF(s), from its serving gNB—one type targeting paging optimization, and one type targeting RRC_CONNECTED state optimization—and autonomously decide which type of CSO(s), or CSF(s), and thus whether to target paging optimization or RRC_CONNECTED state optimization. The basis for such a decision may include any one, or more, of a number of possible input information. This is an option described in the section entitled "Flexible Choice between Paging and RRC_CONNECTED State Optimization".

A UE may be configured with two types of CSO(s), or CSF(s) or beam gain ratio(s), where one may be to be applied in RRC_CONNECTED state and one may be to be applied in RRC_IDLE and RRC_INACTIVE state. If the UE, as described in the paragraph above and in section entitled "Flexible Choice between Paging and RRC_CONNECTED State Optimization", in addition, is configured with two types of CSOs (or CSFs) for RRC_IDLE and RRC_INACTIVE state—one type targeting paging optimization and one type targeting RRC_CONNECTED state optimization—then, when adding the CSO, or CSF or beam gain ratio, type for RRC_CONNECTED state, the UE may be configured with three types of CSOs, or CSFs or beam gain ratios, where the UE may choose which one of two to apply in RRC_IDLE and RRC_INACTIVE state, while the third one is to be applied in RRC_CONNECTED state.

With the variation of the solution described in section entitled "Beam Gain Ratios Explicitly Provided for the Current Cell", a UE in RRC_IDLE or RRC_INACTIVE state may retrieve beam gain ratios from the current cell of the UE and neighbor cells, where each cell may provide the beam gain ratio(s) valid in the cell, and the UE itself may use the retrieved beam gain ratios to compensate DL channel quality measurement results, when comparing measurement results of different cells for the purpose of cell reselection assessment.

With the feature for automatic learning of beam gain ratio differences described in section entitled "Automatic Learning of Beam Gain Ratio Differences Instead of Exchange of Explicit Information", a UE may receive a feature activation command from the network, and possible configuration of feature properties, such as when and how to report, and subsequently record the results of measurements on DL signals for RRC_IDLE and RRC_INACTIVE state measurements, and either or both of page transmissions and DL transmissions in RRC_CONNECTED state, with a beam tailored for the UE, provided the combination of measurements is acquired in the same cell. Further, the UE may report the recorded measurement results to the network in accordance with instructions received in the feature activation command, or in accordance with a standardized default reporting configuration.

Embodiments herein may be understood to leverage the already existing possibility to configure a Cell Specific Offset (CSO) to be applied to the measurement result, e.g., Reference Signal Received Power (RSRP) or SNR or SINR, of a neighbor cell, such as the second cell 122, when comparing the quality of the neighbor cell with that of a current serving cell, such as the first cell 121, or with another neighbor cell.

One advantage of embodiments herein is that the methods described enable cells with different beamforming for DL signal(s) used for cell reselection measurements, e.g., NR-PSS+NR-SSS or SS Block or some other reference signal, paging and RRC_CONNECTED state communication, and with differing relations between these beamforming configurations, particularly in terms of the beamforming gain, to coexist, and still allow consistent and comparable cell reselection measurements and assessments. This means for instance that a UE, when performing cell reselection, may be enabled to rank the quality of the cells in a more similar way to the quality the UE would receive when being actively communicating with the cells or being paged in the cell. When embodiments herein are applied in a manner to optimize for RRC_CONNECTED state communication, a further advantage is that ping-pong behavior in conjunction with transition between RRC_IDLE/RRC_INACTIVE and RRC_CONNECTED state and vice versa is avoided or reduced. Embodiments herein may eliminate the problem that a UE entering RRC_CONNECTED state may immediately be handed over to a neighbor cell, and when the UE subsequently switches to RRC_IDLE or RRC_INACTIVE state, it reselects back to the previous cell again, where this ping-pong behavior is caused by suboptimal target cells being chosen for cell reselection and handover. In summary, suboptimal cell reselection choices are avoided. A similar benefit may also be achieved when embodiments herein are applied for neighbor cell measurements and/or handover assessments/decisions in RRC_CONNECTED state, where embodiments herein may serve to avoid suboptimal target cell selections and/or handover decisions.

The safest way to avoid the above described ping-pong behavior may be to apply embodiments herein in both RRC_IDLE/RRC_INACTIVE and RRC_CONNECTED state, and to gear the RRC_IDLE/RRC_INACTIVE state embodiments towards optimization of RRC_CONNECTED state communication.

Figure 6:
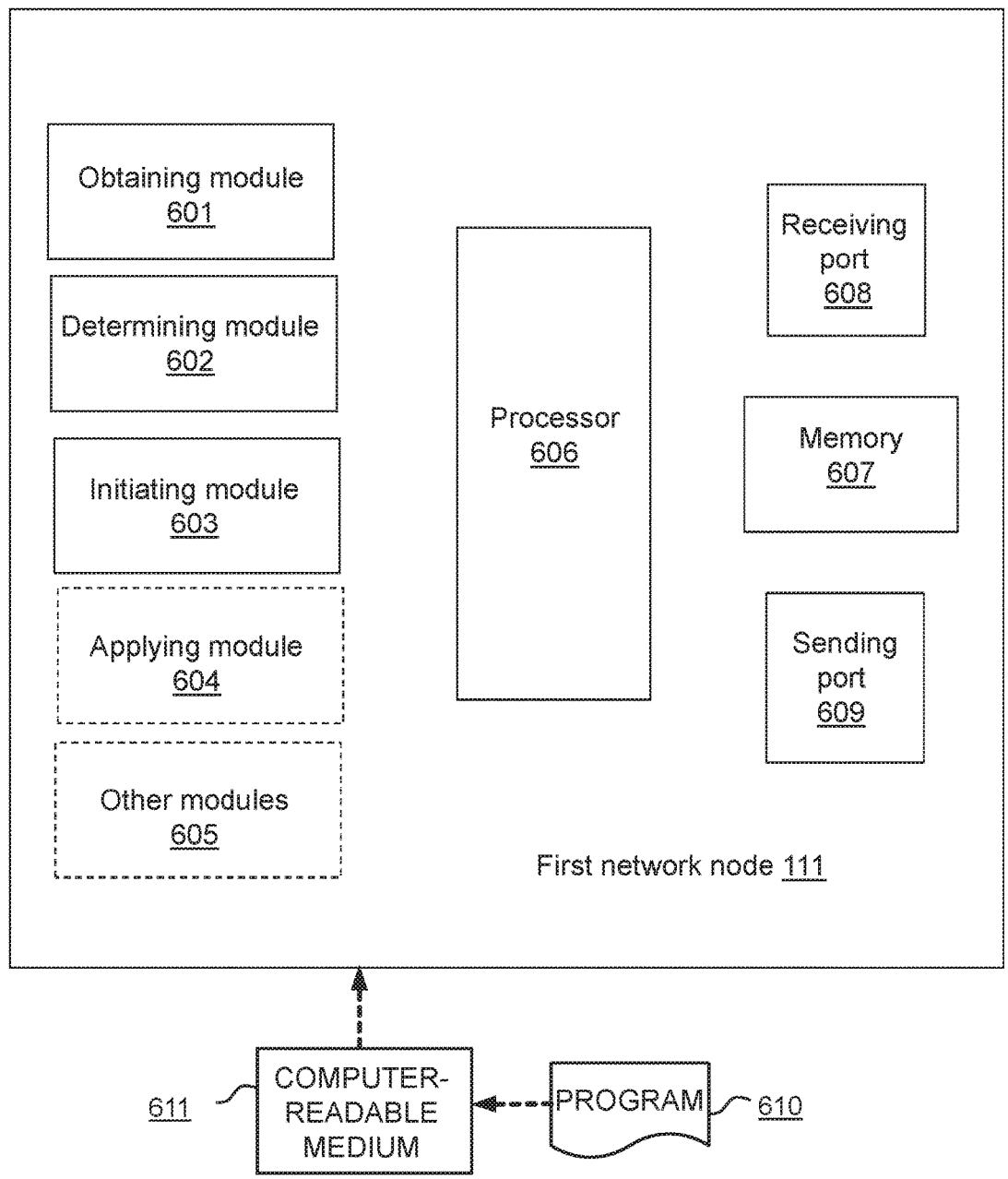
FIG. 6 is a schematic block diagram illustrating embodiments of a first network node, according to embodiments herein.

To perform the method actions described above in relation to FIG. 3, the first network node 111 may comprise the following arrangement depicted in FIG. 6. The first network node 111 is configured to be connected to the second network node 112 configured to serve the wireless device 130 with beamforming in the first cell 121. The first cell 121 is configured to have the second cell 122 as the neighbor cell. Each of the first cell 121 and the second cell 122 are configured to have the first beamforming configuration for the first use corresponding to the first beam gain $BG_M$, and the second beamforming configuration for the second use corresponding to the second beam gain $BG_P$, $BG_C$. The first network node 111, the second network node 112 and the wireless device 130 are configured to operate in the wireless communications network 100.

The detailed description of some of the following corresponds to the same references provided above, in relation to the actions described for the first network node 111, and will thus not be repeated here. For example, the first network node 111 and the second network node 112 may be at least one of: a) the same network node and b) different network nodes.

The first network node 111 is configured to perform the obtaining 301 action, e.g. by means of an obtaining module 601 within the first network node 111 configured to, obtain, for each of the first cell 121 and the second cell 122, the first indication $BGR_{P/M}$, $BGR_{C/M}$ of the second beam gain $BG_P$, $BG_C$ in relation to the first beam gain $BG_M$. The first indication is configured to be cell-specific. The obtaining module 601 may be a processor 606 of the first network node 111, or an application running on such processor.

The first network node 111 is configured to perform the determining 302 action, e.g. by means of a determining module 602 within the first network node 111 configured to, determine, based on the first indication $BGR_{P/M}$, $BGR_{C/M}$ configured to be obtained for each of the first cell 121 and the second cell 122, the first value CSO, CSF to be applied in the first cell selection procedure between the first cell 121 and the second cell 122. The determining module 602 may be the processor 606 of the first network node 111, or an application running on such processor.

The first network node 111 may be configured to perform this initiating 303 action, e.g. by means of an initiating module 603 within the first network node 111 configured to, initiate sending at least one of: i) the second indication of the first value CSO, CSF configured to be determined, and ii) the third indication of the first indication configured to be obtained, to at least one of: the wireless device 130, the second network node 112, and the third network node 113 configured to operate in the wireless communications network 100. The initiating module 603 may be the processor 606 of the first network node 111, or an application running on such processor.

In some embodiments, to determine the first value CSO, CSF may be further configured to be based on the second use in the second cell 122.

The first indication may be the first ratio $BGR_{P/M}$, $BGR_{C/M}$ between the second gain $BG_P$, $BG_C$ and the first gain $BG_M$.

In some embodiments, a) the first use may be configured to be transmission of one or more downlink, DL, signals, and b) the second use may be configured to be one of: i) paging the wireless device 130, and ii) communicating with the wireless device 130 in a connected state.

The second cell 122 may be configured to be served by the third network node 113. The first indication $BGR_{P/M}$, $BGR_{C/M}$ for the second cell 122 may be configured to be obtained by receiving the first indication for the second cell 122 from the third network node 113, or from another network node configured to operate in the wireless communications network 100.

The first indication may be configured to be received from the third network node 113 comprised in the response to the request from the second network node 112 to activate transmission of downlink signals.

Each of the first cell 121 and the second cell 122 may be configured to have the third beamforming configuration for the third use corresponding to the third beam gain $BG_P$, $BG_C$. To obtain may be further configured to comprise obtaining, for each of the first cell 121 and the second cell 122, the fourth indication $BGR_{P/M}$, $BGR_{C/M}$ of the third beam gain $BG_P$, $BG_C$ in relation to the first beam gain $BG_M$. The fourth indication may be configured to be cell-specific. To determine may be further configured to comprise determining, based on the fourth indication $BGR_{P/M}$, $BGR_{C/M}$ configured to be obtained for each of the first cell 121 and the second cell 122, the second value CSO, CSF to be applied in the second cell selection procedure between the first cell 121 and the second cell 122. To initiate sending may be configured to comprise initiating sending the fifth indication of the second value to the at least one of: the wireless device 130, the second network node 112, and the third network node 113.

The first network node 111 may be configured to perform the applying 304 action, e.g. by means an applying module 604 within the first network node 111 configured to, apply at least one of: i) the first value CSO, CSF configured to be determined, in the first cell selection procedure between the first cell 121 and the second cell 122, and ii) the second value CSO, CSF configured to be determined, in the second cell selection procedure between the first cell 121 and the second cell 122. The applying module 604 may be the processor 606 of the first network node 111, or an application running on such processor.

Other modules 605 may be comprised in the first network node 111.

In FIG. 6, optional modules are indicated with dashed boxes.

The embodiments herein may be implemented through one or more processors, such as a processor 606 in the first network node 111 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the in the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 607 comprising one or more memory units. The memory 607 is arranged to be used to store obtained information, store data, configurations, schedulings, and applications etc. to perform the methods herein when being executed in the first network node 111.

In some embodiments, the first network node 111 may receive information from the second network node 112, the third network node 113 and/or the wireless device 130, through a receiving port 608. In some embodiments, the receiving port 608 may be, for example, connected to one or more antennas in first network node 111. In other embodiments, the first network node 111 may receive information from another structure in the wireless communications network 100 through the receiving port 608. Since the receiving port 608 may be in communication with the processor 606, the receiving port 608 may then send the received information to the processor 606. The receiving port 608 may also be configured to receive other information.

The processor 606 in the first network node 111 may be further configured to transmit or send information to e.g., the second network node 112, the third network node 113 and/or the wireless device 130, through a sending port 609, which may be in communication with the processor 606, and the memory 607.

Those skilled in the art will also appreciate that the obtaining module 601, the determining module 602, the initiating module 603, the applying module 604 and the other modules 605 described above may refer to a combination of analog and digital modules, and/or one or more processors configured with software and/or firmware, e.g., stored in memory, that, when executed by the one or more processors such as the processor 606, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 601-605 described above may be implemented as one or more applications running on one or more processors such as the processor 606.

Thus, the methods according to the embodiments described herein for the first network node 111 may be respectively implemented by means of a computer program 610 product, comprising instructions, i.e., software code portions, which, when executed on at least one processor 606, cause the at least one processor 606 to carry out the actions described herein, as performed by the first network node 111. The computer program 610 product may be stored on a computer-readable storage medium 611. The computer-readable storage medium 611, having stored thereon the computer program 610, may comprise instructions which, when executed on at least one processor 606, cause the at least one processor 606 to carry out the actions described herein, as performed by the first network node 111. In some embodiments, the computer-readable storage medium 611 may be a non-transitory computer-readable storage medium, such as a CD ROM disc, a memory stick, or stored in the cloud space. In other embodiments, the computer program 610 product may be stored on a carrier containing the computer program, wherein the carrier is one of an electronic signal, optical signal, radio signal, or the computer-readable storage medium 611, as described above.

The first network node 111 may comprise an interface unit to facilitate communications between the first network node 111 and other nodes or devices, e.g., the second network node 112, the third network node 113, the wireless device 130, or any of the other nodes. In some particular examples, the interface may, for example, include a transceiver configured to transmit and receive radio signals over an air interface in accordance with a suitable standard.

Figure 7:
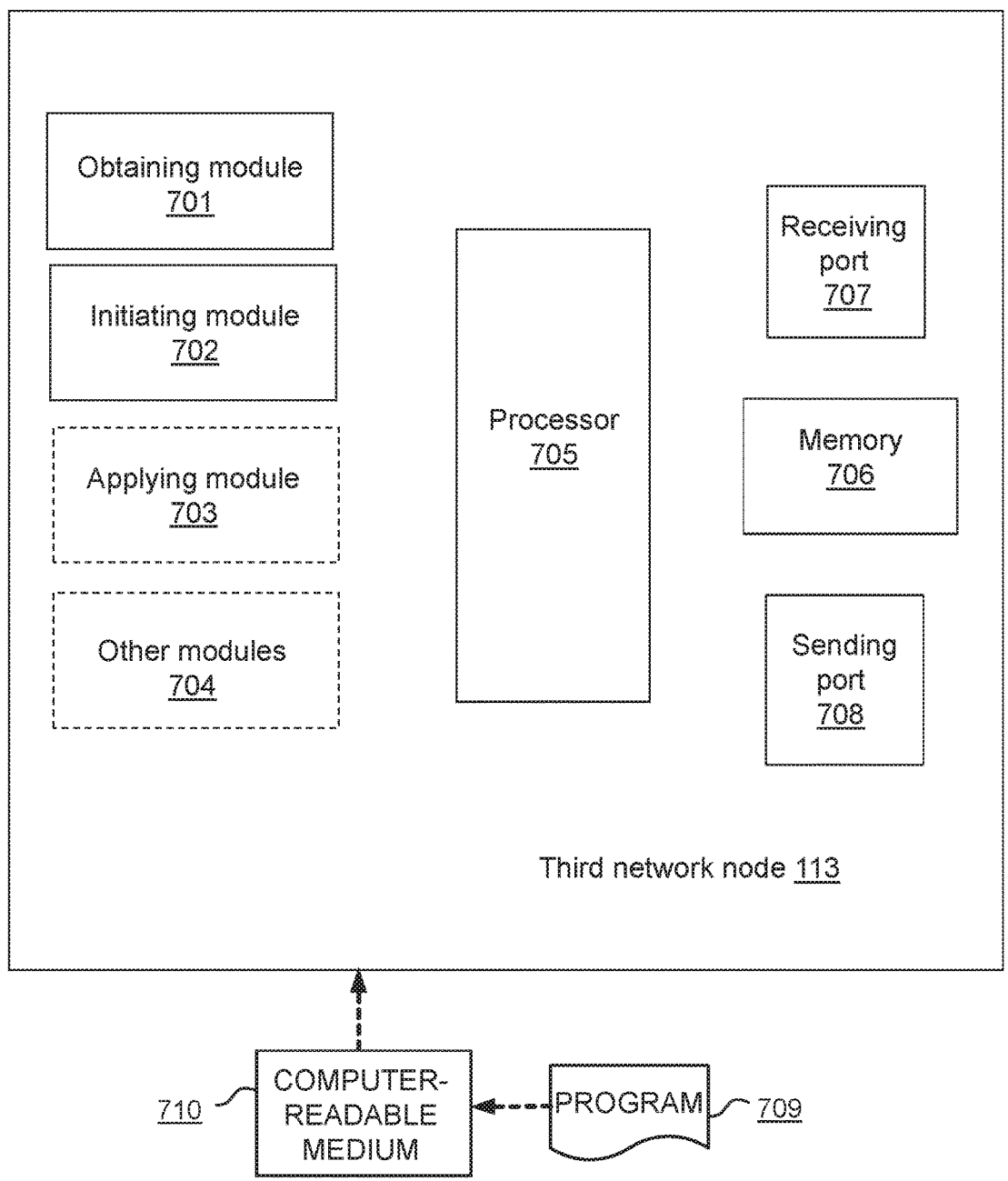
FIG. 7 is a schematic block diagram illustrating embodiments of a third network node, according to embodiments herein.

To perform the method actions described above in relation to FIG. 4, the third network node 113 may comprise the following arrangement depicted in FIG. 7. The third network node 113 is configured to serve the second cell 122 with beamforming. The second cell 122 is configured to have the first beamforming configuration for the first use corresponding to the first beam gain $BG_M$, and the second beamforming configuration for the second use corresponding to the second beam gain $BG_P$, $BG_C$. The third network node 113 is configured to operate in the wireless communications network 100.

The detailed description of some of the following corresponds to the same references provided above, in relation to the actions described for the third network node 113, and will thus not be repeated here. For example, the first use may be configured to be transmission of one or more downlink, DL, signals, and the second use may be configured to be one of: i) paging the wireless device 130, and ii) communicating with the wireless device 130 in the connected state.

The third network node 113 is configured to perform the obtaining 401 action, e.g., by means of an obtaining module 701 within the third network node 113 configured to, obtain, for the second cell 122, the sixth indication $BGR_{P/M}$, $BGR_{C/M}$ of the second beam gain $BG_P$, $BG_C$ in relation to the first beam gain $BG_M$. The sixth indication is configured to be cell-specific. The obtaining module 701 may be the processor 705 of the third network node 113, or an application running on such processor.

The third network node 113 is configured to perform the initiating 402 action, e.g. by means of an initiating module 702 within the third network node 113 configured to, initiate sending the first indication of the sixth indication $BGR_{P/M}$, $BGR_{C/M}$ configured to be obtained to at least one of: the second network node 112 configured to operate in the wireless communications network 100, wherein the second cell 122 is the neighbor to the first cell 121 served by the second network node 122, the wireless device 130 configured to be served by the second network node 112, and the first network node 111 configured to operate in the wireless communications network 100. The initiating module 702 may be the processor 705 of the third network node 113, or an application running on such processor.

In some embodiments, the sixth indication may be configured to be the first ratio $BGR_{P/M}$, $BGR_{C/M}$ between the second beam gain $BG_P$, $BG_C$ and the first beam gain $BG_M$.

The first indication may be configured to be sent by the third network node 113, comprised in the response to the request from the second network node 112 to activate transmission of downlink signals.

Each of the first cell 121 and the second cell 122 may be configured to have the third beamforming configuration for the third use corresponding to the third beam gain $BG_P$, $BG_C$. To obtain may be further configured to comprise obtaining, for each of the first cell 121 and the second cell 122, the fourth indication $BGR_{P/M}$, $BGR_{C/M}$ of the third beam gain $BG_P$, $BG_C$ in relation to the first beam gain $BG_M$. The fourth indication may be configured to be cell-specific. To initiate sending may be further configured to comprise initiating sending the seventh indication of the fourth indication $BGR_{P/M}$, $BGR_{C/M}$ to at least one of: the second network node 112, the wireless device 130 and the first network node 111.

In some embodiments, the third network node 113 may be further configured obtain at least one of: i) the second indication of the first value CSO, CSF to be applied in the first cell selection procedure between the first cell 121 and the second cell 122, wherein to obtain the second indication may be configured to be based on the first indication $BGR_{P/M}$, $BGR_{C/M}$ configured to be obtained for each of the first cell 121 and the second cell 122, and ii) the fifth indication of the second value CSO, CSF to be applied in the second cell selection procedure between the first cell 121 and the second cell 122. To obtain the fifth indication may be configured to be based on the fourth indication $BGR_{P/M}$, $BGR_{C/M}$ configured to be obtained for each of the first cell 121 and the second cell 122. The third network node 113 may be configured to perform this obtaining 403 action, e.g. by means of the obtaining module 701 further configured to perform this action.

To initiate sending may be further configured to comprise initiating sending at least one of the second indication configured to be obtained and the fifth indication configured to be obtained, to at least one of: the second network node 112, the wireless device 130, and the first network node 111.

The third network node 113 may be configured to perform this applying 404 action, e.g. by means of an applying module 703 within the third network node 113 configured to, apply at least one of: i) the first value CSO, CSF configured to be determined in the first cell selection procedure between the first cell 121 and the second cell 122, and ii) the second value CSO, CSF in the second cell selection procedure between the first cell 121 and the second cell 122. The applying module 703 may be the processor 705 of the third network node 113, or an application running on such processor.

Other modules 704 may be comprised in the third network node 113.

In FIG. 7, optional modules are indicated with dashed boxes.

The embodiments herein may be implemented through one or more processors, such as a processor 705 in the third network node 113 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the in the third network node 113. One such carrier may be in the form of a CD ROM disc. It is however feasible with other data carriers such as a memory stick. The computer program code may furthermore be provided as pure program code on a server and downloaded to the third network node 113.

The third network node 113 may further comprise a memory 706 comprising one or more memory units. The memory 706 is arranged to be used to store obtained information, store data, configurations, schedulings, and applications etc. to perform the methods herein when being executed in the third network node 113.

In some embodiments, the third network node 113 may receive information from the second network node 112, the first network node 111 and/or the wireless device 130, through a receiving port 707. In some embodiments, the receiving port 707 may be, for example, connected to one or more antennas in third network node 113. In other embodiments, the third network node 113 may receive information from another structure in the wireless communications network 100 through the receiving port 707. Since the receiving port 707 may be in communication with the processor 705, the receiving port 707 may then send the received information to the processor 705. The receiving port 707 may also be configured to receive other information.

The processor 705 in the third network node 113 may be further configured to transmit or send information to e.g., the second network node 112, the first network node 111, and/or the wireless device 130, through a sending port 708, which may be in communication with the processor 705, and the memory 706.

Those skilled in the art will also appreciate that the obtaining module 701, the initiating module 702, the applying module 703, and the other modules 704 described above may refer to a combination of analog and digital modules, and/or one or more processors configured with software and/or firmware, e.g., stored in memory, that, when executed by the one or more processors such as the processor 705, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 701-704 described above may be implemented as one or more applications running on one or more processors such as the processor 705.

Thus, the methods according to the embodiments described herein for the third network node 113 may be respectively implemented by means of a computer program 709 product, comprising instructions, i.e., software code portions, which, when executed on at least one processor 705, cause the at least one processor 705 to carry out the actions described herein, as performed by the third network node 113. The computer program 709 product may be stored on a computer-readable storage medium 710. The computer-readable storage medium 710, having stored thereon the computer program 709, may comprise instructions which, when executed on at least one processor 705, cause the at least one processor 705 to carry out the actions described herein, as performed by the third network node 113. In some embodiments, the computer-readable storage medium 710 may be a non-transitory computer-readable storage medium, such as a CD ROM disc, a memory stick, or stored in the cloud space. In other embodiments, the computer program 709 product may be stored on a carrier containing the computer program, wherein the carrier is one of an electronic signal, optical signal, radio signal, or the computer-readable storage medium 710, as described above.

The third network node 113 may comprise an interface unit to facilitate communications between the third network node 113 and other nodes or devices, e.g., the first network node 111, the second network node 112, the wireless device 130, or any of the other nodes. In some particular examples, the interface may, for example, include a transceiver configured to transmit and receive radio signals over an air interface in accordance with a suitable standard.

Figure 8:
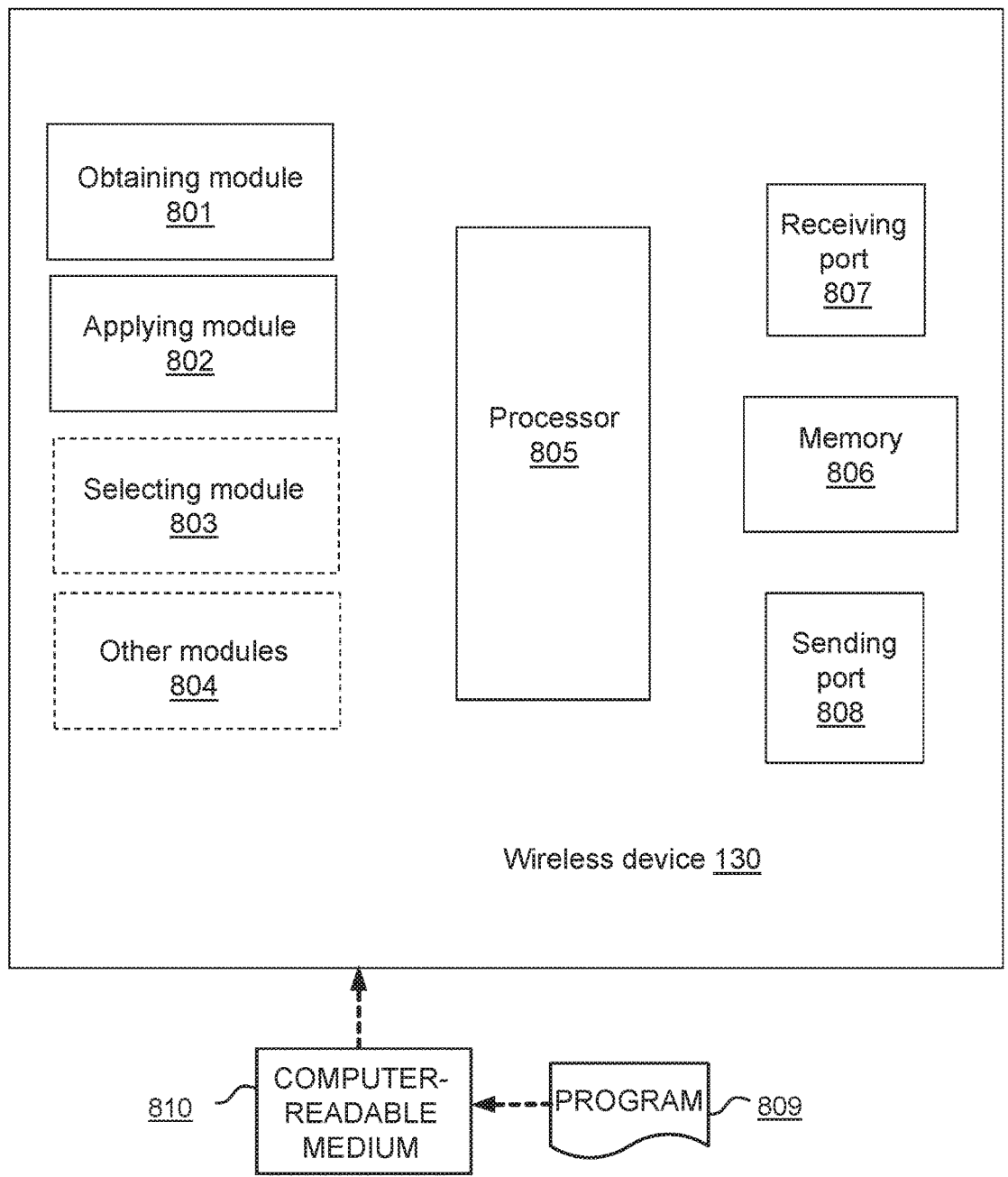
FIG. 8 is a schematic block diagram illustrating embodiments of a wireless device, according to embodiments herein.

To perform the method actions described above in relation to FIG. 5, the wireless device 130 may comprise the following arrangement depicted in FIG. 8.

The wireless device 130 is configured to be served by the second network node 112 with beamforming in the first cell 121. The first cell 121 is configured to have the second cell 122 as the neighbor cell. Each of the first cell 121 and the second cell 122 are configured to have the first beamforming configuration for the first use corresponding to the first beam gain $BG_M$, and the second beamforming configuration for the second use corresponding to the second beam gain $BG_P$, $BG_C$. The wireless device 130 and the second network node 112 are configured to operate in the wireless communications network 100.

The detailed description of some of the following corresponds to the same references provided above, in relation to the actions described for the first network node 111, and will thus not be repeated here. For example, the first use may be configured to be transmission of one or more downlink, DL, signals, and the second use may be configured to be one of: i) paging the wireless device 130, and ii) communicating with the wireless device 130 in the connected state.

The wireless device 130 is configured to perform the obtaining 502 action, e.g. by means of an obtaining module 801 within the wireless device 130 configured to, obtain the second indication of the first value CSO, CSF to be applied in the first cell selection procedure between the first cell 121 and the second cell 122. The first value is configured to be based on a first indication $BGR_{P/M}$, $BGR_{C/M}$ for each of the first cell 121 and the second cell 122, of the second beam gain $BG_P$, $BG_C$ in relation to the first beam gain $BG_M$. The first indication being configured to be cell-specific. The obtaining module 801 may be a processor 805 of the wireless device 130, or an application running on such processor.

The wireless device 130 is configured to perform the applying 504 action, e.g. by means of an applying module 802 within the wireless device 130 configured to, apply the first value CSO, CSF to the first cell selection procedure between the first cell 121 and the second cell 122. The applying module 802 may be the processor 805 of the wireless device 130, or an application running on such processor.

In some embodiments, the wireless device 130 may be further configured obtain, for each of the first cell 121 and the second cell 122, the third indication of the first indication, from at least one of: the first network node 111 configured to operate in the wireless communications network 100, the first network node 111 being configured to be connected to the second network node 112, and the third network node 113. The wireless device 130 may be configured to perform this obtaining 501 action, e.g. by means of the obtaining module 801, configured to perform this action.

The first value CSO, CSF may be further configured to be based on the second use in the second cell 12.

In some embodiments, the first indication may be configured to be the first ratio $BGR_{P/M}$, $BGR_{C/M}$ between the second gain $BG_P$, $BG_C$ and the first gain $BG_M$.

Each of the first cell 121 and the second cell 122 may be configured to have the third beamforming configuration for the third use corresponding to the third beam gain $BG_P$, $BG_C$. To obtain may be further configured to comprise obtaining, for each of the first cell 121 and the second cell 122, the fourth indication $BGR_{P/M}$, $BGR_{C/M}$ of the third beam gain $BG_P$, $BG_C$ in relation to the first beam gain $BG_M$. The fourth indication may be configured to be cell-specific.

In some embodiments, wherein each of the first cell 121 and the second cell 122 may be configured to have the third beamforming configuration for the third use corresponding to the third beam gain $BG_P$, $BG_C$, and wherein to obtain may be further configured to comprise obtaining, based on the fourth indication $BGR_{P/M}$, $BGR_{C/M}$ of the third beam gain $BG_P$, $BG_C$ in relation to the first beam gain $BG_M$ configured to be obtained for each of the first cell 121 and the second cell 122, the second value CSO, CSF to be applied in the second cell selection procedure between the first cell 121 and the second cell 122, the fourth indication being configured to be cell-specific, the wireless device 130 may be further configured to select at least one of: i) the first value CSO, CSF for application in the first cell selection procedure between the first cell 121 and the second cell 122, and ii) the second value CSO, CSF for application in the second cell selection procedure between the first cell 121 and the second cell 122. The wireless device 130 may be configured to perform this selecting 503 action, e.g., by means of a selecting module 803 within the wireless device 130. The selecting module 803 may be the processor 805 of the wireless device 130, or an application running on such processor.

In some embodiments, to apply of the first value CSO, CSF to the cell selection procedure between the first cell 121 and the second cell 122 may be configured to be performed before reporting measurement results in the second cell 122 to the second network node 112.

To apply the first value CSO, CSF to the cell selection procedure between the first cell 121 and the second cell 122 may be configured to be performed during multiple measurements without having to obtain the second indication again.

In some embodiments, the third indication may be configured to be obtained by receiving broadcasted system information or dedicated signalling.

Other modules 804 may be comprised in the wireless device 130.

In FIG. 8, optional modules are indicated with dashed boxes.

The embodiments herein may be implemented through one or more processors, such as a processor 805 in the wireless device 130 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the in the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 806 comprising one or more memory units. The memory 806 is arranged to be used to store obtained information, store data, configurations, schedulings, and applications etc. to perform the methods herein when being executed in the wireless device 130.

In some embodiments, the wireless device 130 may receive information from the first network node 111, the second network node 112, and/or the third network node 113, through a receiving port 807. In some embodiments, the receiving port 807 may be, for example, connected to one or more antennas in wireless device 130. In other embodiments, the wireless device 130 may receive information from another structure in the wireless communications network 100 through the receiving port 807. Since the receiving port 807 may be in communication with the processor 805, the receiving port 807 may then send the received information to the processor 805. The receiving port 807 may also be configured to receive other information.

The processor 805 in the wireless device 130 may be further configured to transmit or send information to e.g., the first network node 111, the second network node 112, and/or the third network node 113, through a sending port 808, which may be in communication with the processor 805, and the memory 806.

Those skilled in the art will also appreciate that the obtaining module 801, the applying module 802, the selecting module 803, and the other modules 804 described above may refer to a combination of analog and digital modules, and/or one or more processors configured with software and/or firmware, e.g., stored in memory, that, when executed by the one or more processors such as the processor 805, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 801-804 described above may be implemented as one or more applications running on one or more processors such as the processor 805.

Thus, the methods according to the embodiments described herein for the wireless device 130 may be respectively implemented by means of a computer program 809 product, comprising instructions, i.e., software code portions, which, when executed on at least one processor 805, cause the at least one processor 805 to carry out the actions described herein, as performed by the wireless device 130. The computer program 809 product may be stored on a computer-readable storage medium 810. The computer-readable storage medium 810, having stored thereon the computer program 809, may comprise instructions which, when executed on at least one processor 805, cause the at least one processor 805 to carry out the actions described herein, as performed by the wireless device 130. In some embodiments, the computer-readable storage medium 810 may be a non-transitory computer-readable storage medium, such as a CD ROM disc, a memory stick, or stored in the cloud space. In other embodiments, the computer program 809 product may be stored on a carrier containing the computer program, wherein the carrier is one of an electronic signal, optical signal, radio signal, or the computer-readable storage medium 810, as described above.

The wireless device 130 may comprise an interface unit to facilitate communications between the wireless device 130 and other nodes or devices, e.g., the first network node 111, the second network node 112, the third network node 113, or any of the other nodes. In some particular examples, the interface may, for example, include a transceiver configured to transmit and receive radio signals over an air interface in accordance with a suitable standard.

When using the word "comprise" or "comprising" it shall be interpreted as non-limiting, i.e. meaning "consist at least of".

The term module may also be understood as a unit.

A processor may be understood to be a hardware component, and may also be referred to as a processing circuit.

The embodiments herein are not limited to the above described preferred embodiments. Various alternatives, modifications and equivalents may be used. Therefore, the above embodiments should not be taken as limiting the scope of the invention.

The invention claimed is:

1. A method performed by a first network node, the first network node being connected to a second network node serving a wireless device with beamforming in a first cell, the first cell having a second cell as a neighbor cell, each of the first cell and the second cell having a first beamforming configuration for a first use corresponding to a first beam gain, and a second beamforming configuration for a second use corresponding to a second beam gain, the first network node, the second network node and the wireless device operating in a wireless communications network, the method comprising:
    obtaining, for each of the first cell and the second cell, a first indication of the second beam gain in relation to the first beam gain, the first indication being cell-specific,
    determining, based on the first indication obtained for each of the first cell and the second cell, a first value to be applied in a first cell selection procedure between the first cell and the second cell, and
    initiating sending at least one of:
        i. a second indication of the determined first value, and
        ii. a third indication of the obtained first indication,
        to at least one of: the wireless device, the second network node, and a third network node operating in the wireless communications network.

2. The method according to claim 1, wherein each of the first cell and the second cell has a third beamforming configuration for a third use corresponding to a third beam gain, and wherein the obtaining further comprises obtaining, for each of the first cell and the second cell, a fourth indication of the third beam gain in relation to the first beam gain, the fourth indication being cell-specific, and wherein the determining further comprises determining, based on the fourth indication obtained for each of the first cell and the second cell, a second value to be applied in a second cell selection procedure between the first cell and the second cell, and wherein the initiating sending comprises initiating sending a fifth indication of the second value to the at least one of: the wireless device, the second network node, and the third network node.

3. The method according to any of claim 2, wherein the method further comprises:
    applying at least one of:
        i. the determined first value in the first cell selection procedure between the first cell and the second cell, and
        ii. the determined second value in the second cell selection procedure between the first cell and the second cell.

4. A method performed by a third network node, the third network node serving a second cell with beamforming, the second cell having a first beamforming configuration for a first use corresponding to a first beam gain, and a second beamforming configuration for a second use corresponding to a second beam gain, the third network node operating in a wireless communications network comprising a plurality of network nodes, the method comprising:

obtaining, for the second cell, a sixth indication of the second beam gain in relation to the first beam gain, the sixth indication being cell-specific, and initiating sending a first indication of the obtained sixth indication to at least one of: a second network node operating in the wireless communications network, wherein the second cell is a neighbor to a first cell served by the second network node, a wireless device served by the second network node, and a first network node operating in the wireless communications network.

5. The method of claim 4, wherein each of the first cell and the second cell has a third beamforming configuration for a third use corresponding to a third beam gain, and wherein the obtaining further comprises obtaining, for each of the first cell and the second cell, a fourth indication of the third beam gain in relation to the first beam gain, the fourth indication being cell-specific, and wherein the initiating sending further comprises initiating sending a seventh indication of the fourth indication to at least one of: the second network node, the wireless device and the first network node.

6. The method according to claim 5, wherein the method further comprises:
obtaining at least one of:
 i. a second indication of a first value to be applied in a first cell selection procedure between the first cell and the second cell, the obtaining of the second indication being based on the first indication obtained for each of the first cell and the second cell, and
 ii. a fifth indication of a second value to be applied in a second cell selection procedure between the first cell and the second cell, the obtaining of the fifth indication being based on the fourth indication obtained for each of the first cell and the second cell.

7. The method of claim 6, wherein the initiating sending further comprises initiating sending at least one of the obtained second indication and the obtained fifth indication to at least one of: the second network node, the wireless device, and the first network node.

8. The method of claim 6, further comprising:
applying at least one of:
 i. the first value in the first cell selection procedure between the first cell and the second cell, and
 ii. the second value in the second cell selection procedure between the first cell and the second cell.

9. A method performed by a wireless device, the wireless device being served by a second network node with beamforming in a first cell, the first cell having a second cell as a neighbor cell, each of the first cell and the second cell having a first beamforming configuration for a first use corresponding to a first beam gain, and a second beamforming configuration for a second use corresponding to a second beam gain, the wireless device and the second network node operating in a wireless communications network comprising a plurality of network nodes, the method comprising:
obtaining a second indication of a first value to be applied in a first cell selection procedure between the first cell and the second cell, the first value being based on a first indication, for each of the first cell and the second cell, of the second beam gain in relation to the first beam gain, the first indication being cell-specific, and
applying the first value to the first cell selection procedure between the first cell and the second cell.

10. The method according to claim 9, further comprising:
obtaining, for each of the first cell and the second cell, a third indication of the first indication, from at least one of: a first network node operating in the wireless communications network, the first network node being connected to the second network node, and a third network node.

11. The method according to claim 9, wherein each of the first cell and the second cell has a third beamforming configuration for a third use corresponding to a third beam gain, and wherein the obtaining further comprises obtaining, based on a fourth indication of the third beam gain in relation to the first beam gain obtained for each of the first cell and the second cell, a second value to be applied in a second cell selection procedure between the first cell and the second cell, the fourth indication being cell-specific, and wherein the method further comprises:
selecting at least one of:
 i. the first value for application in the first cell selection procedure between the first cell and the second cell, and
 ii. the second value for application in the second cell selection procedure between the first cell and the second cell.

12. The method according to claim 11, wherein the applying of the first value to the first cell selection procedure between the first cell and the second cell is performed before reporting measurement results in the second cell to the second network node.

13. The method according to claim 12, wherein the applying of the first value to the first cell selection procedure between the first cell and the second cell is performed during multiple measurements without having to obtain the second indication again.

14. The method according to claim 10, wherein the third indication is obtained by receiving broadcasted system information or dedicated signalling.

15. A first network node configured to be connected to a second network node configured to serve a wireless device with beamforming in a first cell, the first cell being configured to have a second cell as a neighbor cell, each of the first cell and the second cell being configured to have a first beamforming configuration for a first use corresponding to a first beam gain, and a second beamforming configuration for a second use corresponding to a second beam gain, the first network node, the second network node and the wireless device being configured to operate in a wireless communications network, the first network node being further configured to:
obtain, for each of the first cell and the second cell, a first indication of the second beam gain in relation to the first beam gain, the first indication being configured to be cell-specific,
determine, based on the first indication configured to be obtained for each of the first cell and the second cell, a first value to be applied in a first cell selection procedure between the first cell and the second cell, and
initiate sending at least one of:
 i. a second indication of the first value configured to be determined, and
 ii. a third indication of the first indication configured to be obtained,
to at least one of: the wireless device, the second network node, and a third network node configured to operate in the wireless communications network.

16. The first network node according to claim 15, wherein each of the first cell and the second cell is configured to have a third beamforming configuration for a third use corresponding to a third beam gain, and wherein to obtain is further configured to comprise obtaining, for each of the first cell and the second cell, a fourth indication of the third beam gain in relation to the first beam gain, the fourth indication being configured to be cell-specific, and wherein to determine is further configured to comprise determining, based on the fourth indication configured to be obtained for each of the first cell and the second cell, a second value to be applied in a second cell selection procedure between the first cell and the second cell, and wherein to initiate sending is configured to comprise initiating sending a fifth indication of the second value to the at least one of: the wireless device, the second network node, and the third network node.

17. The first network node according to claim 16, wherein the first network node is further configured to:
apply at least one of:
i. the first value configured to be determined, in the first cell selection procedure between the first cell and the second cell, and
ii. the second value configured to be determined, in the second cell selection procedure between the first cell and the second cell.

18. A third network node configured to serve a second cell with beamforming, the second cell being configured to have a first beamforming configuration for a first use corresponding to a first beam gain, and a second beamforming configuration for a second use corresponding to a second beam gain, the third network node being configured to operate in a wireless communications network comprising a plurality of network nodes, the third network node being further configured to:
obtain, for the second cell, a sixth indication of the second beam gain in relation to the first beam gain, the sixth indication being configured to be cell-specific, and
initiate sending a first indication of the sixth indication configured to be obtained to at least one of: a second network node configured to operate in the wireless communications network, wherein the second cell is a neighbor to a first cell served by the second network node, a wireless device configured to be served by the second network node, and a first network node configured to operate in the wireless communications network.

19. The third network node of claim 18, wherein each of the first cell and the second cell is configured to have a third beamforming configuration for a third use corresponding to a third beam gain, and wherein to obtain is further configured to comprise obtaining, for each of the first cell and the second cell, a fourth indication of the third beam gain in relation to the first beam gain, the fourth indication being configured to be cell-specific, and wherein to initiate sending is further configured to comprise initiating sending a seventh indication of the fourth indication to at least one of: the second network node, the wireless device and the first network node.

20. The third network node according to claim 19, wherein the third network node is further configured to:
obtain at least one of:
i. a second indication of a first value to be applied in a first cell selection procedure between the first cell and the second cell, wherein to obtain the second indication is configured to be based on the first indication configured to be obtained for each of the first cell and the second cell, and
ii. a fifth indication of a second value to be applied in a second cell selection procedure between the first cell and the second cell, wherein to obtain the fifth indication is configured to be based on the fourth indication configured to be obtained for each of the first cell and the second cell.

21. The third network node of claim 20, being further configured to:
apply at least one of:
i. the first value configured to be determined in the first cell selection procedure between the first cell and the second cell, and
ii. the second value in the second cell selection procedure between the first cell and the second cell.

22. A wireless device configured to be served by a second network node with beamforming in a first cell, the first cell being configured to have a second cell as a neighbor cell, each of the first cell and the second cell being configured to have a first beamforming configuration for a first use corresponding to a first beam gain, and a second beamforming configuration for a second use corresponding to a second beam gain, the wireless device and the second network node being configured to operate in a wireless communications network comprising a plurality of network nodes, the wireless device being further configured to:
obtain a second indication of a first value to be applied in a first cell selection procedure between the first cell and the second cell, the first value being configured to be based on a first indication, for each of the first cell and the second cell, of the second beam gain in relation to the first beam gain, the first indication being configured to be cell-specific, and
apply the first value to the first cell selection procedure between the first cell and the second cell.

23. The wireless device according to claim 22, being further configured to:
obtain, for each of the first cell and the second cell, a third indication of the first indication, from at least one of: a first network node configured to operate in the wireless communications network, the first network node being configured to be connected to the second network node, and a third network node.

24. The wireless device according to claim 23, wherein each of the first cell and the second cell is configured to have a third beamforming configuration for a third use corresponding to a third beam gain, and wherein to obtain is further configured to comprise obtaining, for each of the first cell and the second cell, a fourth indication of the third beam gain in relation to the first beam gain, the fourth indication being configured to be cell-specific.

25. The wireless device according to claim 23, wherein each of the first cell and the second cell is configured to have a third beamforming configuration for a third use corresponding to a third beam gain, and wherein to obtain is further configured to comprise obtaining, based on a fourth indication of the third beam gain in relation to the first beam gain configured to be obtained for each of the first cell and the second cell, a second value to be applied in a second cell selection procedure between the first cell and the second cell, the fourth indication being configured to be cell-specific, and wherein the wireless device is further configured to:
select at least one of:
i. the first value for application in the first cell selection procedure between the first cell and the second cell, and
ii. the second value for application in the second cell selection procedure between the first cell and the second cell.

* * * * *